(12) United States Patent
Xiao et al.

(10) Patent No.: US 12,395,389 B2
(45) Date of Patent: *Aug. 19, 2025

(54) PARAMETER CONFIGURATION AND PARAMETER RECEIVING METHODS AND APPARATUS, AND STORAGE MEDIUM

(71) Applicant: ZTE CORPORATION, Guangdong (CN)

(72) Inventors: Huahua Xiao, Shenzhen (CN); Chuangxin Jiang, Shenzhen (CN); Zhaohua Lu, Shenzhen (CN); Yong Li, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,176

(22) Filed: Apr. 25, 2024

(65) Prior Publication Data

US 2024/0275654 A1 Aug. 15, 2024

Related U.S. Application Data

(63) Continuation of application No. 17/236,341, filed on Apr. 21, 2021, now Pat. No. 12,003,358, which is a
(Continued)

(30) Foreign Application Priority Data

Oct. 24, 2018 (CN) .......................... 201811247396.4

(51) Int. Cl.
*H04L 27/26* (2006.01)

(52) U.S. Cl.
CPC ........ *H04L 27/2613* (2013.01); *H04L 27/262* (2013.01)

(58) Field of Classification Search
CPC . H04L 27/2613; H04L 27/262; H04L 5/0051; H04L 27/261; H04L 27/26136; H04L 5/0007; H04L 27/06; H04B 7/0456
See application file for complete search history.

(56) References Cited

U.S. PATENT DOCUMENTS 7,729,433 B2 * 6/2010 Jalloul ................... H04B 1/707
375/275
9,172,516 B2 * 10/2015 Xu ......................... H04L 5/0051
(Continued)

FOREIGN PATENT DOCUMENTS

| CN | 108667581 A | 10/2018 |
|---|---|---|
| WO | WO-2009/006827 A1 | 1/2009 |

OTHER PUBLICATIONS

Ericsson, "Feature lead proposal on low PAPR DMRS", 3GPP TSG RAN WG1 Meeting #94 bis, R1-1811988, Oct. 8, 2018, Chengdu, China (6 pages).
(Continued)

*Primary Examiner* — Julio R Perez
(74) *Attorney, Agent, or Firm* — Foley & Lardner LLP

(57) ABSTRACT

Provided are parameter configuration and parameter receiving methods and apparatuses, and a storage medium. The parameter configuration method includes: configuring reference pilot sequence parameters, and determining, according to the reference pilot sequence parameters, an initial value of a reference pilot pseudo-random sequence corresponding to each reference pilot group among M reference pilot groups, where the initial value of the reference pilot pseudo-random sequence is used for generating a pilot pseudo-random sequence of a corresponding reference pilot group, M is a positive integer, and each reference pilot group corresponds to at least one reference pilot port.

8 Claims, 4 Drawing Sheets

Related U.S. Application Data continuation of application No. PCT/CN2019/112929, filed on Oct. 24, 2019.

(56) References Cited

U.S. PATENT DOCUMENTS

| | | | |
|---|---|---|---|
| 11,973,578 B2 | 4/2024 | Liu et al. | |
| 12,003,358 B2* | 6/2024 | Xiao | H04L 27/262 |
| 2010/0061360 A1* | 3/2010 | Chen | H04L 5/0051 |
| | | | 375/296 |
| 2012/0033643 A1* | 2/2012 | Noh | H04L 25/0226 |
| | | | 370/335 |
| 2018/0026684 A1 | 1/2018 | Wei et al. | |
| 2020/0119962 A1 | 4/2020 | Nammi et al. | |
| 2021/0297299 A1* | 9/2021 | Xiao | H04L 27/262 |
| 2022/0119950 A1* | 4/2022 | Bansal | C23C 16/45565 |

OTHER PUBLICATIONS

Ericsson, "Future lead proposal on low PAPR DMRS" 3GPP TSG RAN WG1 Meeting #94bis, R1-1811988, Oct. 8, 2018, Chengdu, China (6 pages).

Ericsson, "On specification-based solutions to the DMRS PAPR issue" 3GPP TSG RAN WG1 Meeting #94-bis, R1-1811542, Oct. 8, 2018, Chengdu, China (5 pages).

Ericsson: "Conclusion on the need for CSI-RS and DMRS PAPR reduction", 3GPP TSG RAN WG1 Meeting #94bis, R1-1811184, Chengdu, China, Oct. 12, 2018 (15 pages).

Extended European Search Report for EP Appl. No. 19876133.0, dated Jun. 24, 2022 (9 pages).

Huawei et al.: "Discussion on PAPR for CSI-RS and DMRS", 3GPP TSG RAN WG1 Meeting #94bis, RI-1810703, Chengdu, China, Oct. 12, 2018 (3 pages).

Intel Corporation, "On the remaining details of DM-RS" 3GPP TSG RAN WG1 Meeting NR #3, R1-1716300, Sep. 18, 2017, Nagoya, Japan (17 pages).

International Search Report and Written Opinion on PCT/CN2019/112929, mailed Jan. 15, 2020 (10 pages, including English translation).

Non-Final Office Action on U.S. Appl. No. 17/236,341 DTD Aug. 16, 2023.

Notice of Allowance on U.S. Appl. No. 17/236,341 DTD Mar. 4, 2024.

OPPO: "Evaluation on DMRS for PAPR reduction", 3GPP TSG RAN WG1 Meeting #94bis, R1-1810968, Chengdu, China, Oct. 12, 2018 (3 pages).

Qualcomm Incorporated: "Lower PAPR reference signals", 3GPP TSG RAN WG1 Meeting #94bis, R1-1811280, Chengdu, China, Oct. 12, 2018 (15 pages).

Second Office Action for CN Appl. No. 202111447330.1, dated Jun. 2, 2023 (with English translation, 10 pages).

Vivo, "Discussion on low PAPR RS" 3GPP TSG RAN WG1 Meeting #94bis, R1-1810405, Oct. 8, 2018, Chengdu, China (4 pages).

"3rd Generation Partnership Project; Technical Specification Group Radio Access Network; NR; Physical channels and modulation (Release 15)", 3GPP TS 38.211 V15.3.0 (Sep. 2018), 96 pages.

AT&T, "Analysis of PAPR Issue in NR", 3GPP TSG RAN WG1 Meeting #94bis, R1-1810683, Oct. 12, 2018, Chengdu, China (18 pages).

Ericsson, "Feature lead proposal on low PAPR DMRS", 3GPP TSG RAN WG1 Meeting #94bis, R1-1812022, Oct. 12, 2018, Chengdu, China (6 pages).

Intel Corporation, "Summary on Codebook based UL Transmission", 3GPP TSG RAN WG1 Meeting #94b, R1-1811852, Oct. 12, 2018, Chengdu, China (13 pages).

* cited by examiner

PARAMETER CONFIGURATION AND PARAMETER RECEIVING METHODS AND APPARATUS, AND STORAGE MEDIUM

This application is a Continuation of U.S. application Ser. No. 17/236,341, filed Apr. 21, 2021, which is a Continuation of International application No. PCT/CN2019/112929 filed Oct. 24, 2019, which claims priority to Chinese Patent Application No. 201811247396.4 filed Oct. 24, 2018, the disclosure of each of which is incorporated herein by reference in its entirety.

TECHNICAL FIELD

The present disclosure relates to the field of communications and, for example, to parameter configuration and parameter receiving methods and apparatuses, and a storage medium.

BACKGROUND

At present, the wireless communication system has developed and evolved from fourth generation technologies including Long Term Evolution (LTE) and LTE-advanced (LTE-a) to fifth generation technologies including New Radio Access Technology (New RAT/NR). In these systems, reference signals such as downlink Channel-State Information Reference Signals (CSI-RSs) or uplink Sounding Reference Signals (SRSs) need to be sent to estimate Channel-State Information (CSI), and reference signals such as Demodulation Reference Signals (DMRSs) also need to be sent for data demodulation.

In the current NR version (Release 15), the pattern of DMRS reference signals has two main forms, including pilot pattern configuration 1 and pilot pattern configuration 2. As shown in FIG. 1, pilot pattern configuration 1 is a pilot configuration based on interval frequency division multiplexing (IFDM). Such a pilot configuration divides frequency domain subcarriers into two combs at equal intervals. Each comb corresponding to a respective one DMRS code division multiplexing (CDM) group. Pilots of one port are transmitted only on one comb, and such pilots are also referred to as DMRS Type 1 pilots. As shown in FIG. 2, pilot pattern configuration 2 is a pilot pattern based on frequency domain-orthogonal cover code (FD-OCC). Such a pilot pattern uses Nocc adjacent subcarriers for transmitting pilot signals, where pilot signals of different ports are distinguished by OCCs, and Nocc is the sequence length of the OCC. Such pilots are also referred to as DMRS Type 2 pilots. There are at most three groups of DMRS ports in the frequency domain. The DMRS ports between groups are distinguished by the frequency domain, and the ports in one DMRS group are distinguished by OCCs. A group of ports distinguished by OCCs is one DMRS CDM Group, and there are at most three CDM Groups.

In related protocols, different DMRS CDM groups correspond to the same pilot sequence, as shown in FIG. 3. Since the pilot sequences of the different CDM Groups are the same, signals may be superimposed in a same direction in the time domain, resulting in a relatively high peak-to-average power ratio (PAPR), that is, the transmission power sometimes may be greater than the average power while sometimes less than the average power at different time domain sampling points, and the value of the maximum transmission power divided by the average power may exceed the capability of the transmission antenna unit. Similarly, relatively large PAPRs may also be generated in CSI-RS.

SUMMARY

Embodiments of the present invention provide parameter configuration and parameter receiving methods and apparatuses, and a storage medium to at least solve the problem of excessive PAPR of reference signals caused by the same sequence of reference pilot groups in the related art.

According to an embodiment of the present invention, a parameter configuration method is provided. The method includes the steps described below.

Reference pilot sequence parameters are configured, and an initial value of a reference pilot pseudo-random sequence corresponding to each reference pilot group among M reference pilot groups is determined according to the reference pilot sequence parameters, where the initial value of the reference pilot pseudo-random sequence is used for generating a pilot pseudo-random sequence of a corresponding reference pilot group, M is a positive integer, and each reference pilot group corresponds to at least one reference pilot port.

According to another embodiment of the present invention, a parameter receiving method is further provided. The method includes: receiving reference pilot sequence parameters, and determining, according to the reference pilot sequence parameters, an initial value of a reference pilot pseudo-random sequence corresponding to each reference pilot group among M reference pilot groups, where the initial value of the reference pilot pseudo-random sequence is used for generating a pilot pseudo-random sequence of a corresponding reference pilot group, M is a positive integer, and each reference pilot group corresponds to at least one reference pilot port.

According to another embodiment of the present invention, a parameter configuration apparatus is further provided. The apparatus includes a configuration module and a first determination module.

The configuration module is configured to configure reference pilot sequence parameters.

The first determination module is configured to determine, according to the reference pilot sequence parameters, an initial value of a reference pilot pseudo-random sequence corresponding to each reference pilot group among M reference pilot groups, where the initial value of the reference pilot pseudo-random sequence is used for generating a pilot pseudo-random sequence of a corresponding reference pilot group, M is a positive integer, and each reference pilot group corresponds to at least one reference pilot port.

According to another embodiment of the present invention, a parameter receiving apparatus is further provided. The apparatus includes a reception module and a second determination module.

The reception module is configured to receive reference pilot sequence parameters.

The second determination module is configured to determine, according to the reference pilot sequence parameters, an initial value of a reference pilot pseudo-random sequence corresponding to each reference pilot group among M reference pilot groups, where the initial value of the reference pilot pseudo-random sequence is used for generating a pilot pseudo-random sequence of a corresponding reference pilot group, M is a positive integer, and each reference pilot group corresponds to at least one reference pilot port.

According to another embodiment of the present invention, a storage medium is further provided. The storage medium stores a computer program which is configured to, when executed, perform the parameter configuration method.

According to another embodiment of the present invention, a storage medium is further provided. The storage medium stores a computer program which is configured to, when executed, perform the parameter receiving method.

Through the present disclosure, reference pilot sequence parameters are configured, and an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group, and each reference pilot group corresponds to at least one reference pilot port. Through the above solution, the problem of excessive PAPR of reference signals caused by the same pilot sequence in the related art can be solved, and thus the PAPR of reference signals can be effectively reduced.

DETAILED DESCRIPTION

The present disclosure will be hereinafter described in detail with reference to drawings in conjunction with embodiments.

It is to be noted that the terms "first", "second" and the like in the description, claims and drawings of the present disclosure are used to distinguish between similar objects and are not necessarily used to describe a particular order or sequence.

Embodiment One

Figure 1:
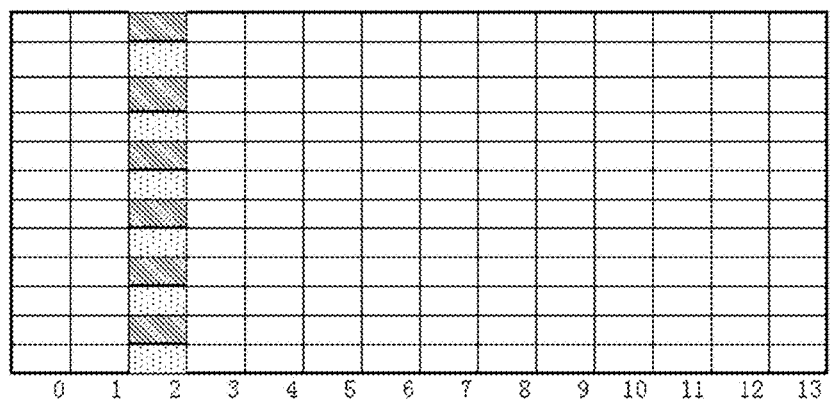
FIG. 1 is a schematic diagram of DMRS Type 1 pilots in the related art.
Figure 2:
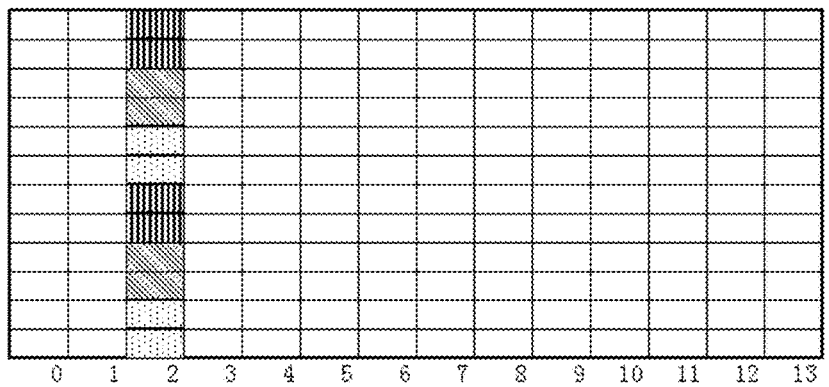
FIG. 2 is a schematic diagram of DMRS Type 2 pilots in the related art.
Figure 3:
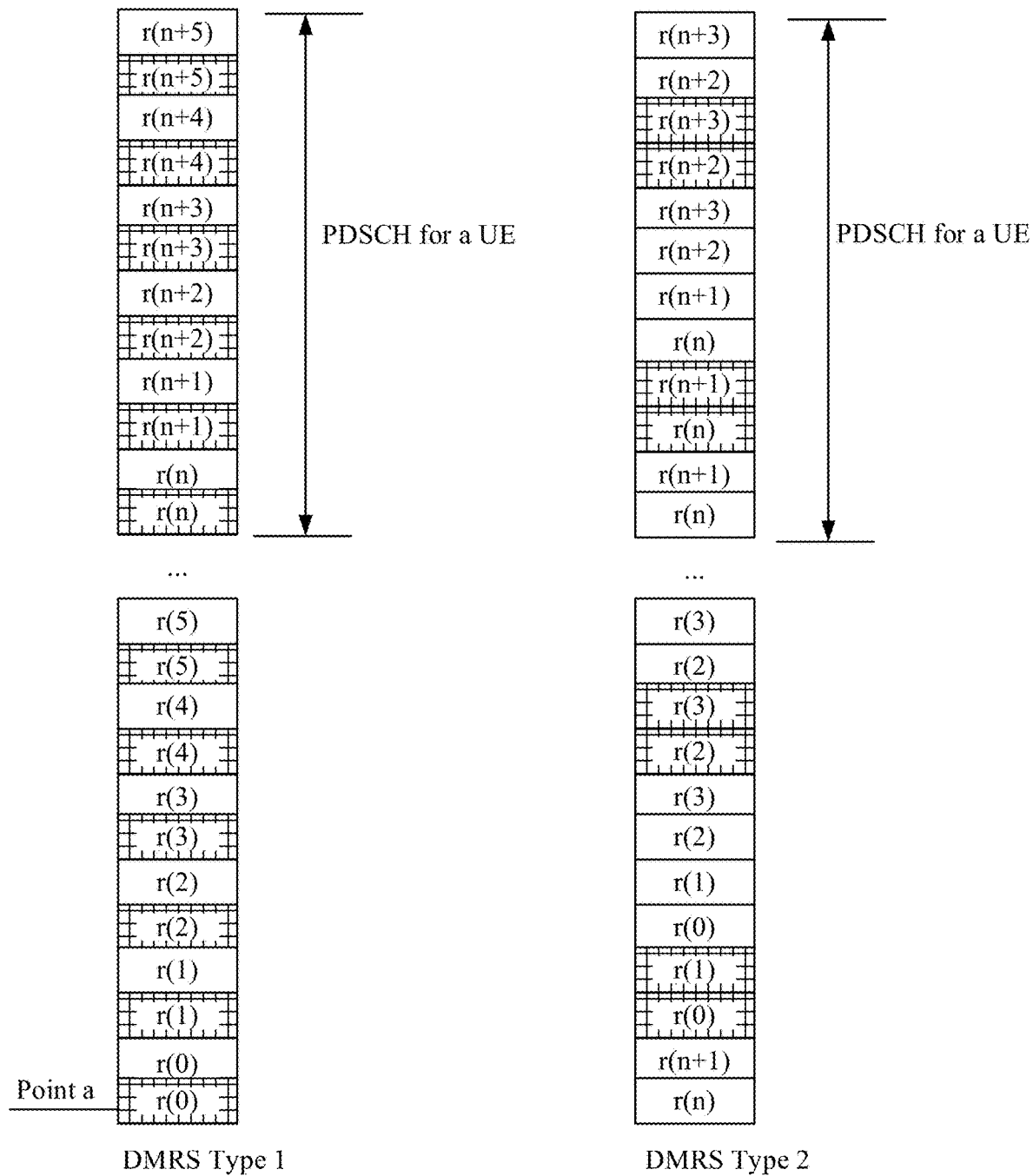
FIG. 3 is a schematic diagram of pilot sequences of DMRS Type 1 or DMRS Type 2 in the related art.
Figure 4:
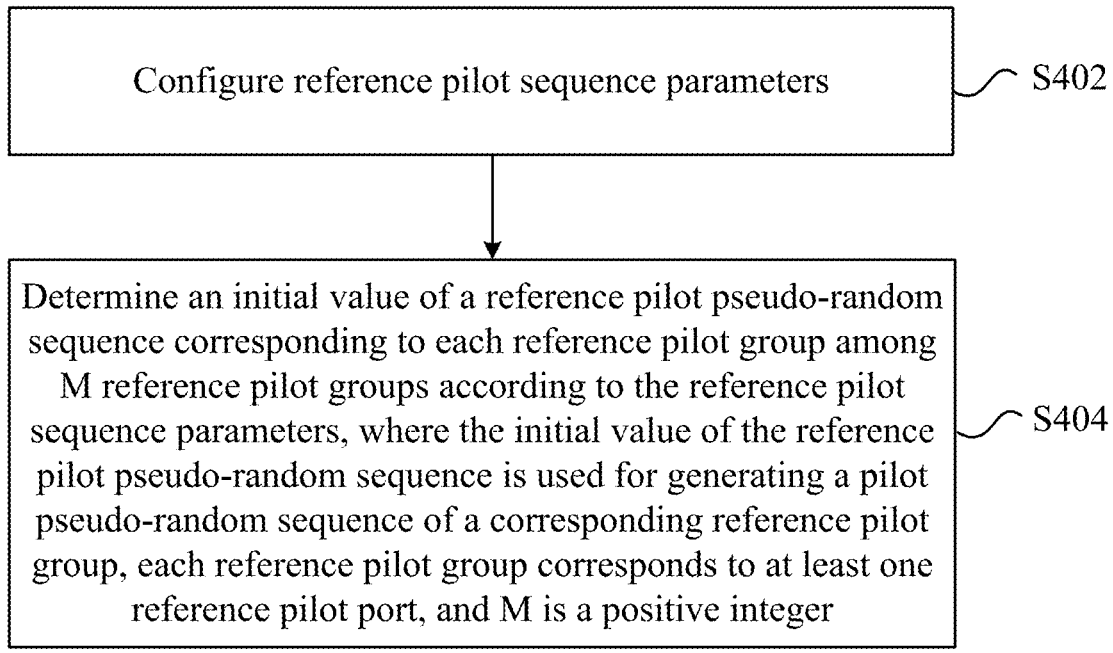
FIG. 4 is a flowchart of a parameter configuration method according to an embodiment of the present invention.

The embodiment provides a parameter configuration method. FIG. 4 is a flowchart of a parameter configuration method according to an embodiment of the present invention. As shown in FIG. 4, the method includes the steps S402 and S404.

In step S402, reference pilot sequence parameters are configured.

In step S404, an initial value of a reference pilot pseudo-random sequence corresponding to each reference pilot group among M reference pilot groups is determined according to the reference pilot sequence parameters, where the initial value of the reference pilot pseudo-random sequence is used for generating a pilot pseudo-random sequence of a corresponding reference pilot group, M is a positive integer, and each reference pilot group corresponds to at least one reference pilot port.

Through the present disclosure, reference pilot sequence parameters are configured, and an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group. Through the above solution, the problem of excessive PAPR of reference signals caused by the same pilot sequence in the related art can be solved, and thus the PAPR of reference signals can be effectively reduced.

It is to be noted that within the scope of embodiment of the present invention, the reference pilot signal may also be referred to as the concepts such as a reference signal, a pilot signal, and a reference pilot, and the signal used for channel measurement or channel estimation includes, but is not limited to, a DMRS, a CSI-RS, and an SRS. For CSI-RSs, CSI-RSs are also divided into multiple groups, the CSI-RSs in each group are distinguished by code division, and such a CSI-RS group is also a CSI-RS CDM Group.

The reference pilot groups include at least one of: a reference pilot port group, a reference pilot CDM group, or a CDM group corresponding to a reference pilot port.

The reference pilot sequence parameters include at least one of: a static identification, a static identification step size, a dynamic identification, a reference pilot group index, and a fallback weight w, where the reference pilot group index includes a reference pilot group absolute index and a reference pilot group relative index.

The method includes at least one of: configuring the static identification through high layer signaling; configuring the static identification step size through high layer signaling; configuring the dynamic identification through physical layer signaling; configuring the reference pilot group index through physical layer signaling; configuring the fallback weight w through high layer signaling or physical layer signaling; or determining the fallback weight w through the static identification or the dynamic identification.

In an embodiment, K static identifications are configured through high layer signaling, and the K static identifications are divided into L static identification groups, where K is a positive even number, and L is an integer greater than 1 and less than K.

The method includes at least one of: determining a value of K according to at least one of: the number of the reference pilot groups, the number of transport layers, or a reference pilot type; determining a value of L according to the number of the reference pilot groups; or determining the number of static identifications included in one of the static identification groups according to the number of pilot port groups.

The method includes at least one of: selecting the static identification group through the dynamic identification and the reference pilot group index; selecting the static identification group through the dynamic identification; selecting the static identification group through the reference pilot group index; selecting the static identification through the dynamic identification and the reference pilot group index; or determining the fallback weight w through the static identification or the dynamic identification.

The initial value of the reference pilot pseudo-random sequence corresponding to each reference pilot group among the M reference pilot groups is determined according to the reference pilot sequence parameters in at least one of the following manners: determining the initial value of the reference pilot pseudo-random sequence corresponding to each reference pilot group among the M reference pilot groups at least according to a static identification and a reference pilot group index; determining the initial value of the reference pilot pseudo-random sequence corresponding to each reference pilot group among the M reference pilot groups at least according to a static identification, a reference pilot group index, and a static identification step size; determining the initial value of the reference pilot pseudo-random sequence corresponding to each reference pilot group among the M reference pilot groups at least according to a static identification, a reference pilot group index, and a dynamic identification; or determining the initial value of the reference pilot pseudo-random sequence corresponding to each reference pilot group among the M reference pilot groups at least according to a static identification, a reference pilot group index, a dynamic identification, and a static identification step size.

The initial value of the reference pilot pseudo-random sequence corresponding to each reference pilot group among the M reference pilot groups is determined according to the reference pilot sequence parameters in at least one of the following manners: determining the initial value of the reference pilot pseudo-random sequence corresponding to each reference pilot group among the M reference pilot groups at least according to a static identification, a reference pilot group index, and a modulo operation; determining the initial value of the reference pilot pseudo-random sequence corresponding to each reference pilot group among the M reference pilot groups at least according to a static identification, a reference pilot group index, a static identification step size, and a modulo operation; determining the initial value of the reference pilot pseudo-random sequence corresponding to each reference pilot group among the M reference pilot groups at least according to a static identification, a reference pilot group index, a dynamic identification, and a modulo operation; or determining the initial value of the reference pilot pseudo-random sequence corresponding to each reference pilot group among the M reference pilot groups at least according to a static identification, a reference pilot group index, a dynamic identification, a static identification step size, and a modulo operation.

In an embodiment of the present invention, the static identification includes a first location static identification and a second location static identification, and the modulo operation includes one of the following operations:

performing a modulo operation on a calculation result of the static identification and the reference pilot group index;

performing a modulo operation on a calculation result of the static identification, the reference pilot group index, and the static identification step size;

performing a modulo operation on a calculation result of the first location static identification and the reference pilot group index;

performing a modulo operation on a calculation result of the first location static identification, the reference pilot group index, and the static identification step size;

performing a modulo operation on a calculation result of the second location static identification and the reference pilot group index;

performing a modulo operation on a calculation result of the second location static identification, the reference pilot group index, and the static identification step size;

performing a modulo operation on a calculation result of the first location static identification and the reference pilot group index, and performing a modulo operation on a calculation result of the second location static identification and the reference pilot group index;

performing a modulo operation on a calculation result of the first location static identification, the reference pilot group index, and the static identification step size, and performing a modulo operation on a calculation result of the second location static identification, the reference pilot group index, and the static identification step size;

performing a modulo operation on a calculation result of the static identification, the dynamic identification, and the reference pilot group index;

performing a modulo operation on a calculation result of the static identification, the dynamic identification, the reference pilot group index, and the static identification step size;

performing a modulo operation on a calculation result of the first location static identification, the dynamic identification, and the reference pilot group index;

performing a modulo operation on a calculation result of the second location static identification, the dynamic identification, and the reference pilot group index;

performing a modulo operation on a calculation result of the first location static identification, the dynamic identification, the reference pilot group index, and the static identification step size;

performing a modulo operation on a calculation result of the second location static identification, the dynamic identification, the reference pilot group index, and the static identification step size;

performing a modulo operation on a calculation result of the first location static identification, the dynamic identification, and the reference pilot group index, and performing a modulo operation on a calculation result of the second location static identification, the dynamic identification, and the reference pilot group index; or performing a modulo operation on a calculation result of the first location static identification, the dynamic identification, the reference pilot group index, and the static identification step size, and performing a modulo operation on a calculation result of the second location static identification, the dynamic identification, the reference pilot group index, and the static identification step size.

In an embodiment of the present invention, the reference pilot pseudo-random sequences of the M reference pilot groups include first-type reference pilot pseudo-random sequences and second-type reference pilot pseudo-random sequences, where the first-type reference pilot pseudo-random sequences include sequences whose values are the same among the reference pilot pseudo-random sequences of the M reference pilot groups, and the second-type reference pilot pseudo-random sequences include sequences whose values are different among the reference pilot pseudo-random sequences of the M reference pilot group.

In an embodiment of the present invention, that reference pilot pseudo-random sequences of the M reference pilot groups are first-type reference pilot pseudo-random sequences is determined through at least one of the following: a value of a dynamic identifier being zero; a value of a static identifier step size being zero; values of static identifiers corresponding to the M reference pilot groups being identical to each other; or a value of a fallback weight w being zero.

In another aspect, when a terminal or a base station transmits a reference pilot signal, the terminal or the base station may performing precoding on the reference signal, and in this way, signals of the same transmission antenna element are superimposed signals from multiple reference pilot signals. For example, when a DMRS used by a user to perform data demodulation is transmitted, signals on a port for transmitting the DMRS is composed of signals transmitted by the transmission antenna element according to a weight indicated by precoding. Meanwhile, it also means that the same transmission antenna element needs to transmit signals on multiple DMRS ports. Because of the superposition of multiple reference signals on the same transmission antenna element, the transmission power on different symbols is either much higher than the average power or much lower than the average power, causing power imbalance. To solve the above problem, the embodiment of the present invention further provides the following solution.

In an embodiment of the present invention, in response to a reference pilot being a DMRS, the base station instructs, through indication information of precoding or indication information of DMRS ports, the terminal to perform one of the following operations: multiplying at least one column in the precoding used by a coefficient, or multiplying the DMRS on at least one port for transmitting the DMRS by a coefficient, and instructs the terminal to transmit the DMRS.

In an embodiment of the present invention, the indication information meets at least one of the following conditions: the DMRS ports indicated by the indication information being one of the following port sets: a port set of DMRS Type 1: {0, 4}, {0, 1, 4}, {0, 1, 4, 5}, {2, 6}, {2, 3, 6}, {2, 3, 6, 7}, or {0, 2, 4, 6}, or a port set of DMRS Type 2: {0, 1, 6}, {0, 1, 6, 7}, {2, 3, 8}, {2, 3, 8, 9}, or {4, 5, 10, 11}; or precoding codewords indicated by the indication information having one of the following characteristics: all elements in a precoding codeword matrix being non-zero, or in a precoding word matrix, at least one row having two non-zero elements.

In an embodiment of the present invention, the DMRS on the at least one port for transmitting the DMRS is multiplied by the coefficient in the following manner: coefficients multiplied by the DMRS on three ports for transmitting the DMRS being included in coefficients multiplied by the DMRS on four ports for transmitting the DMRS, and coefficients multiplied by the DMRS on two ports for transmitting the DMRS being included in the coefficients multiplied by the DMRS on three ports for transmitting the DMRS.

In an embodiment of the present invention, a coefficient multiplied on each port varies with frequency domain resource elements and/or a coefficient multiplied on each port varies with time domain resource elements.

In an embodiment of the present invention, at least one column in the precoding used is multiplied by the coefficient in the following manner: coefficients multiplied by two columns in the precoding being included in coefficients multiplied by three columns in the precoding, and the coefficients multiplied by three columns in the precoding being included in coefficients multiplied by four columns in the precoding.

In an embodiment of the present invention, a coefficient multiplied by each column in the precoding varies with frequency domain resource elements and/or a coefficient multiplied by each column in the precoding varies with time domain resource elements.

Embodiment Two

Figure 5:
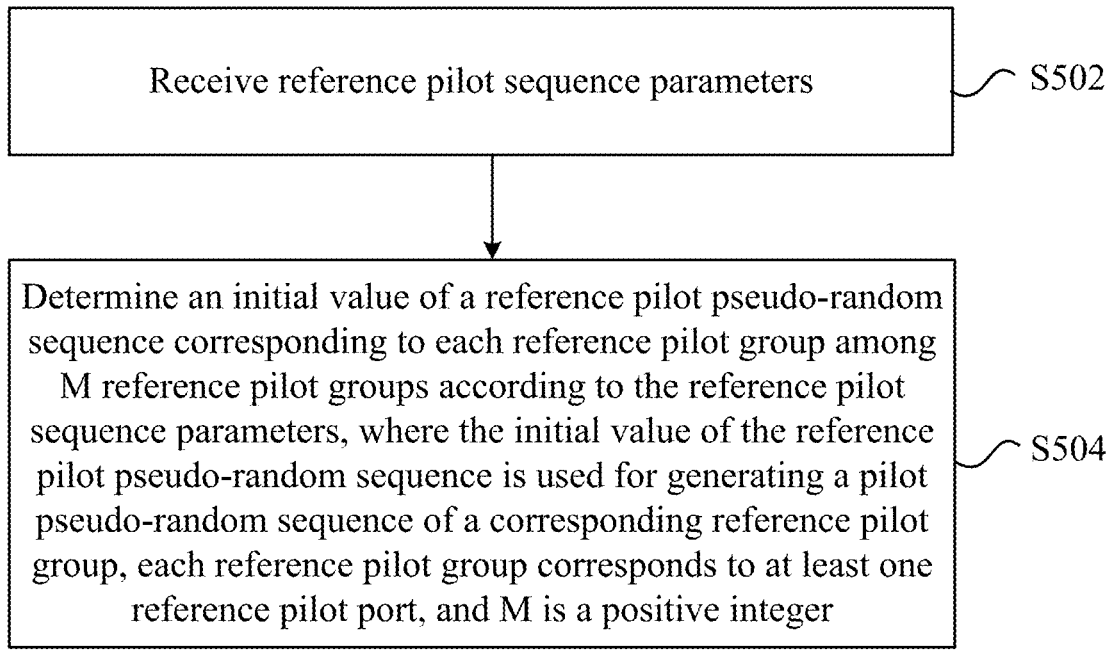
FIG. 5 is a flowchart of a parameter receiving method according to an embodiment of the present invention.

The embodiment provides a parameter receiving method. FIG. 5 is a flowchart of a parameter receiving method according to an embodiment of the present invention. As shown in FIG. 5, the method includes the steps S502 and S504.

In step S502, reference pilot sequence parameters are received.

In step S504, an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group, each reference pilot group corresponds to at least one reference pilot port, and M is a positive integer.

Through the above steps, reference pilot sequence parameters are received, and an initial value of a reference pilot pseudo-random sequence corresponding to each reference pilot group among M reference pilot groups is determined according to the reference pilot sequence parameters, where the initial value of the reference pilot pseudo-random sequence is used for generating a pilot pseudo-random sequence of a corresponding reference pilot group. Through the above solution, the problem of excessive PAPR of reference signals caused by the same pilot sequence in the related art can be solved, and thus the PAPR of reference signals can be effectively reduced.

In an embodiment of the present invention, the reference pilot groups include at least one of: a reference pilot port group, a reference pilot CDM group, or a CDM group corresponding to a reference pilot port.

In an embodiment of the present invention, the reference pilot sequence parameters include at least one of: a static identification, a static identification step size, a dynamic identification, a reference pilot group index, and a fallback weight w, where the reference pilot group index includes a reference pilot group absolute index and a reference pilot group relative index.

In an embodiment of the present invention, the method includes at least one of: configuring the static identification through high layer signaling; configuring the static identification step size through high layer signaling; configuring the dynamic identification through physical layer signaling; configuring the reference pilot group index through physical layer signaling; configuring the fallback weight w through high layer signaling or physical layer signaling; or determining the fallback weight w through the static identification or the dynamic identification.

In an embodiment of the present invention, K static identifications are configured through high layer signaling, and the K static identifications are divided into L static identification groups, where K is a positive even number, and L is an integer greater than 1 and less than K.

In an embodiment of the present invention, the method includes at least one of: determining a value of K according to at least one of: the number of the reference pilot groups, the number of transport layers, or a reference pilot type; determining a value of L according to the number of the reference pilot groups; or determining the number of static identifications included in one of the static identification groups according to the number of pilot port groups.

In an embodiment of the present invention, the method includes at least one of: selecting the static identification group through the dynamic identification and the reference pilot group index; selecting the static identification group through the dynamic identification; selecting the static identification group through the reference pilot group index; or selecting the static identification through the dynamic identification and the reference pilot group index.

In an embodiment of the present invention, the initial value of the reference pilot pseudo-random sequence corresponding to each reference pilot group among the M reference pilot groups is determined according to the reference pilot sequence parameters in at least one of the following manners: determining the initial value of the reference pilot pseudo-random sequence corresponding to each reference pilot group among the M reference pilot groups at least according to a static identification and a reference pilot group index; determining the initial value of the reference pilot pseudo-random sequence corresponding to each reference pilot group among the M reference pilot groups at least according to a static identification, a reference pilot group index, and a static identification step size; determining the initial value of the reference pilot pseudo-random sequence corresponding to each reference pilot group among the M reference pilot groups at least according to a static identification, a reference pilot group index, and a dynamic identification; or determining the initial value of the reference pilot pseudo-random sequence corresponding to each reference pilot group among the M reference pilot groups at least according to a static identification, a reference pilot group index, a dynamic identification, and a static identification step size.

In an embodiment, the initial value of the reference pilot pseudo-random sequence corresponding to each reference pilot group among the M reference pilot groups is determined according to the reference pilot sequence parameters in at least one of the following manners:

determining the initial value of the reference pilot pseudo-random sequence corresponding to each reference pilot group among the M reference pilot groups at least according to a static identification, a reference pilot group index, and a modulo operation; determining the initial value of the reference pilot pseudo-random sequence corresponding to each reference pilot group among the M reference pilot groups at least according to a static identification, a reference pilot group index, a static identification step size, and a modulo operation; determining the initial value of the reference pilot pseudo-random sequence corresponding to each reference pilot group among the M reference pilot groups at least according to a static identification, a reference pilot group index, a dynamic identification, and a modulo operation; or determining the initial value of the reference pilot pseudo-random sequence corresponding to each reference pilot group among the M reference pilot groups at least according to a static identification, a reference pilot group index, a dynamic identification, a static identification step size, and a modulo operation.

In an embodiment of the present invention, the static identification includes a first location static identification and a second location static identification, and the modulo operation includes one of the following operations:

performing a modulo operation on a calculation result of the static identification and the reference pilot group index;

performing a modulo operation on a calculation result of the static identification, the reference pilot group index, and the static identification step size;

performing a modulo operation on a calculation result of the first location static identification and the reference pilot group index;

performing a modulo operation on a calculation result of the first location static identification, the reference pilot group index, and the static identification step size;

performing a modulo operation on a calculation result of the second location static identification and the reference pilot group index;

performing a modulo operation on a calculation result of the second location static identification, the reference pilot group index, and the static identification step size;

performing a modulo operation on a calculation result of the first location static identification and the reference pilot group index, and performing a modulo operation on a calculation result of the second location static identification and the reference pilot group index;

performing a modulo operation on a calculation result of the first location static identification, the reference pilot group index, and the static identification step size, and performing a modulo operation on a calculation result of the second location static identification, the reference pilot group index, and the static identification step size;

performing a modulo operation on a calculation result of the static identification, the dynamic identification, and the reference pilot group index;

performing a modulo operation on a calculation result of the static identification, the dynamic identification, the reference pilot group index, and the static identification step size;

performing a modulo operation on a calculation result of the first location static identification, the dynamic identification, and the reference pilot group index;

performing a modulo operation on a calculation result of the second location static identification, the dynamic identification, and the reference pilot group index;

performing a modulo operation on a calculation result of the first location static identification, the dynamic identification, the reference pilot group index, and the static identification step size;

performing a modulo operation on a calculation result of the second location static identification, the dynamic identification, the reference pilot group index, and the static identification step size;

performing a modulo operation on a calculation result of the first location static identification, the dynamic identification, and the reference pilot group index, and performing a modulo operation on a calculation result of the second location static identification, the dynamic identification, and the reference pilot group index; or performing a modulo operation on a calculation result of the first location static identification, the dynamic identification, the reference pilot group index, and the static identification step size, and performing a modulo operation on a calculation result of the second location static identification, the dynamic identification, the reference pilot group index, and the static identification step size.

In an embodiment of the present invention, the reference pilot pseudo-random sequences of the M reference pilot groups include first-type reference pilot pseudo-random sequences and second-type reference pilot pseudo-random sequences, where the first-type reference pilot pseudo-random sequences include sequences whose values are the same among the reference pilot pseudo-random sequences of the M reference pilot groups, and the second-type reference pilot pseudo-random sequences include sequences whose values are different among the reference pilot pseudo-random sequences of the M reference pilot group.

In an embodiment of the present invention, that reference pilot pseudo-random sequences of the M reference pilot groups are determined to be first-type reference pilot pseudo-random sequences through at least one of the following:

a value of a dynamic identifier being zero; a value of a static identifier step size being zero; values of static identifiers corresponding to the M reference pilot groups being identical to each other; or a value of a fallback weight w being zero.

In an embodiment of the present invention, in response to a reference signal being a DMRS, the terminal receives indication information of precoding or indication information of DMRS ports to perform at least one of the following operations: multiplying at least one column in the precoding used by a coefficient, or multiplying the DMRS on at least one port for transmitting the DMRS by a coefficient, and the terminal is instructed to transmit the DMRS.

In an embodiment of the present invention, the indication information meets at least one of the following conditions: the DMRS ports indicated by the indication information being one of the following port sets: a port set of DMRS Type 1: {0, 4}, {0, 1, 4}, {0, 1, 4, 5}, {2, 6}, {2, 3, 6}, {2, 3, 6, 7}, or {0, 2, 4, 6}, or a port set of DMRS Type 2: {0, 1, 6}, {0, 1, 6, 7}, {2, 3, 8}, {2, 3, 8, 9}, or {4, 5, 10, 11}; or precoding codewords indicated by the indication information having one of the following characteristics: all elements in a precoding codeword matrix being non-zero, or in a precoding word matrix, at least one row having two non-zero elements.

In an embodiment of the present invention, the DMRS on the at least one port for transmitting the DMRS is multiplied by the coefficient in the following manner: coefficients multiplied by the DMRS on three ports for transmitting the DMRS being included in coefficients multiplied by the DMRS on four ports for transmitting the DMRS, and coefficients multiplied by the DMRS on two ports for transmitting the DMRS being included in the coefficients multiplied by the DMRS on three ports for transmitting the DMRS.

In an embodiment of the present invention, a coefficient multiplied on each port varies with frequency domain resource elements, and/or a coefficient multiplied on each port varies with time domain resource elements.

In an embodiment of the present invention, at least one column in the precoding used is multiplied by the coefficient in the following manner: coefficients multiplied by two columns in the precoding being included in coefficients multiplied by three columns in the precoding, and the coefficients multiplied by three columns in the precoding being included in coefficients multiplied by four columns in the precoding.

In an embodiment of the present invention, a coefficient multiplied by each column in the precoding varies with frequency domain resource elements and/or a coefficient multiplied by each column in the precoding varies with time domain resource elements.

From the description of the preceding embodiments, it will be apparent to those skilled in the art that the method in the preceding embodiments may be implemented by software plus a necessary general-purpose hardware platform or may of course be implemented by hardware. However, in many cases, the former is a preferred implementation. Based on this understanding, the solutions provided by the present disclosure substantially, or the part contributing to the related art, may be embodied in the form of a software product. The computer software product is stored in a storage medium (such as a read-only memory (ROM)/random-access memory (RAM), a magnetic disk or an optical disk) and includes several instructions for enabling a terminal device (which may be a mobile phone, a computer, a server, a network device, or the like) to execute the method according to each embodiment of the present invention.

Embodiment Three

An embodiment of the present invention further provides a parameter configuration apparatus which is configured to implement the above-mentioned embodiments and implementations. What has been described will not be repeated. As used below, the term "module" may be software, hardware or a combination thereof capable of implementing predetermined functions. The apparatus in the embodiment described below is preferably implemented by software, but an implementation by hardware or by a combination of software and hardware is also possible and conceivable.

Figure 6:
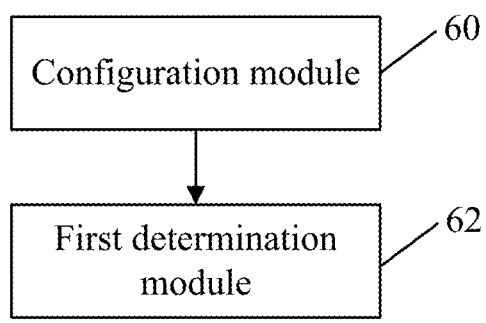
FIG. 6 is a structural diagram of a parameter configuration apparatus according to an embodiment of the present invention.

FIG. 6 is a structural diagram of a parameter configuration apparatus according to an embodiment of the present invention. As shown in FIG. 6, the apparatus includes a configuration module 60 and a first determination module 62.

The configuration module 60 is configured to configure reference pilot sequence parameters.

The first determination module 62 is configured to determine, according to the reference pilot sequence parameters, an initial value of a reference pilot pseudo-random sequence corresponding to each reference pilot group among the M reference pilot groups, where the initial value of the reference pilot pseudo-random sequence is used for generating a pilot pseudo-random sequence of a corresponding reference pilot group, each reference pilot group corresponds to at least one reference pilot port, and M is a positive integer.

Through the above modules, reference pilot sequence parameters are received, and an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group. Through the above solution, the problem of excessive PAPR of reference signals caused by the same pilot sequence in the related art can be solved, and thus the PAPR of reference signals can be effectively reduced.

In an embodiment of the present invention, the reference pilot groups include at least one of: a reference pilot port group, a reference pilot CDM group, or a CDM group corresponding to a reference pilot port.

In an embodiment of the present invention, the reference pilot sequence parameters include at least one of: a static identification, a static identification step size, a dynamic identification, a reference pilot group index, and a fallback weight w, where the reference pilot group index includes a reference pilot group absolute index and a reference pilot group relative index.

In an embodiment of the present invention, the method includes at least one of:

configuring the static identification through high layer signaling;

configuring the static identification step size through high layer signaling;

configuring the dynamic identification through physical layer signaling;

configuring the reference pilot group index through physical layer signaling;

configuring the fallback weight w through high layer signaling or physical layer signaling; or determining the fallback weight w through the static identification or the dynamic identification.

In an embodiment of the present invention, K static identifications are configured through high layer signaling, and the K static identifications are divided into L static identification groups, where K is a positive even number, and L is an integer greater than 1 and less than K.

In an embodiment of the present invention, the method includes at least one of:

determining a value of K according to at least one of: the number of the reference pilot groups, the number of transport layers, or a reference pilot type;

determining a value of L according to the number of the reference pilot groups; or determining the number of static identifications included in one of the static identification groups according to the number of pilot port groups.

The method includes one of:

selecting the static identification group through the dynamic identification and the reference pilot group index;

selecting the static identification group through the dynamic identification;

selecting the static identification group through the reference pilot group index; or selecting the static identification through the dynamic identification and the reference pilot group index.

In an embodiment of the present invention, the initial value of the reference pilot pseudo-random sequence corresponding to each reference pilot group among the M reference pilot groups is determined according to the reference pilot sequence parameters in at least one of the following manners:

determining the initial value of the reference pilot pseudo-random sequence corresponding to each reference pilot group among the M reference pilot groups at least according to a static identification and a reference pilot group index;

determining the initial value of the reference pilot pseudo-random sequence corresponding to each reference pilot group among the M reference pilot groups at least according to a static identification, a reference pilot group index, and a static identification step size;

determining the initial value of the reference pilot pseudo-random sequence corresponding to each reference pilot group among the M reference pilot groups at least according to a static identification, a reference pilot group index, and a dynamic identification; or determining the initial value of the reference pilot pseudo-random sequence corresponding to each reference pilot group among the M reference pilot groups at least according to a static identification, a reference pilot group index, a dynamic identification, and a static identification step size.

In an embodiment of the present invention, the initial value of the reference pilot pseudo-random sequence corresponding to each reference pilot group among the M reference pilot groups is determined according to the reference pilot sequence parameters in at least one of the following manners:

determining the initial value of the reference pilot pseudo-random sequence corresponding to each reference pilot group among the M reference pilot groups at least according to a static identification, a reference pilot group index, and a modulo operation; determining the initial value of the reference pilot pseudo-random sequence corresponding to each reference pilot group among the M reference pilot groups at least according to a static identification, a reference pilot group index, a static identification step size, and a modulo operation; determining the initial value of the reference pilot pseudo-random sequence corresponding to each reference pilot group among the M reference pilot groups at least according to a static identification, a reference pilot group index, a dynamic identification, and a modulo operation; or determining the initial value of the reference pilot pseudo-random sequence corresponding to each reference pilot group among the M reference pilot groups at least according to a static identification, a reference pilot group index, a dynamic identification, a static identification step size, and a modulo operation.

In an embodiment of the present invention, the static identification includes a first location static identification and a second location static identification, and the modulo operation includes one of the following operations:

performing a modulo operation on a calculation result of the static identification and the reference pilot group index;

performing a modulo operation on a calculation result of the static identification, the reference pilot group index, and the static identification step size;

performing a modulo operation on a calculation result of the first location static identification and the reference pilot group index;

performing a modulo operation on a calculation result of the first location static identification, the reference pilot group index, and the static identification step size;

performing a modulo operation on a calculation result of the second location static identification and the reference pilot group index;

performing a modulo operation on a calculation result of the second location static identification, the reference pilot group index, and the static identification step size;

performing a modulo operation on a calculation result of the first location static identification and the reference pilot group index, and performing a modulo operation on a calculation result of the second location static identification and the reference pilot group index;

performing a modulo operation on a calculation result of the first location static identification, the reference pilot group index, and the static identification step size, and performing a modulo operation on a calculation result of the second location static identification, the reference pilot group index, and the static identification step size;

performing a modulo operation on a calculation result of the static identification, the dynamic identification, and the reference pilot group index;

performing a modulo operation on a calculation result of the static identification, the dynamic identification, the reference pilot group index, and the static identification step size;

performing a modulo operation on a calculation result of the first location static identification, the dynamic identification, and the reference pilot group index;

performing a modulo operation on a calculation result of the second location static identification, the dynamic identification, and the reference pilot group index;

performing a modulo operation on a calculation result of the first location static identification, the dynamic identification, the reference pilot group index, and the static identification step size;

performing a modulo operation on a calculation result of the second location static identification, the dynamic identification, the reference pilot group index, and the static identification step size;

performing a modulo operation on a calculation result of the first location static identification, the dynamic identification, and the reference pilot group index, and performing a modulo operation on a calculation result of the second location static identification, the dynamic identification, and the reference pilot group index; or performing a modulo operation on a calculation result of the first location static identification, the dynamic identification, the reference pilot group index, and the static identification step size, and performing a modulo operation on a calculation result of the second location static identification, the dynamic identification, the reference pilot group index, and the static identification step size.

In an embodiment of the present invention, the reference pilot pseudo-random sequences of the M reference pilot groups include first-type reference pilot pseudo-random sequences and second-type reference pilot pseudo-random sequences, where the first-type reference pilot pseudo-random sequences include sequences whose values are the same among the reference pilot pseudo-random sequences of the M reference pilot groups, and the second-type reference pilot pseudo-random sequences include sequences whose values are different among the reference pilot pseudo-random sequences of the M reference pilot group.

In an embodiment of the present invention, that reference pilot pseudo-random sequences of the M reference pilot groups are determined to be first-type reference pilot pseudo-random sequences through at least one of the following:

a value of a dynamic identifier being zero; a value of a static identifier step size being zero; values of static identifiers corresponding to the M reference pilot groups being identical to each other; or a value of a fallback weight w being zero.

In an embodiment of the present invention, in response to a reference signal being a DMRS, the base station instructs, through indication information of precoding or indication information of DMRS ports, the terminal to perform one of the following operations: multiplying at least one column in the precoding used by a coefficient, or multiplying the DMRS on at least one port for transmitting the DMRS by a coefficient, and instructs the terminal to transmit the DMRS.

In an embodiment of the present invention, the indication information meets at least one of the following conditions:

the DMRS ports indicated by the indication information being one of the following port sets: a port set of DMRS Type 1: {0, 4}, {0, 1, 4}, {0, 1, 4, 5}, {2, 6}, {2, 3, 6}, {2, 3, 6, 7}, or {0, 2, 4, 6}, or a port set of DMRS Type 2: {0, 1, 6}, {0, 1, 6, 7}, {2, 3, 8}, {2, 3, 8, 9}, or {4, 5, 10, 11}; or precoding codewords indicated by the indication information having one of the following characteristics: all elements in a precoding codeword matrix being non-zero, or in a precoding word matrix, at least one row having two non-zero elements.

In an embodiment of the present invention, the DMRS on the at least one port for transmitting the DMRS is multiplied by the coefficient in the following manner: coefficients multiplied by the DMRS on three ports for transmitting the DMRS being included in coefficients multiplied by the DMRS on four ports for transmitting the DMRS, and coefficients multiplied by the DMRS on two ports for transmitting the DMRS being included in the coefficients multiplied by the DMRS on three ports for transmitting the DMRS.

In an embodiment of the present invention, a coefficient multiplied on each port varies with frequency domain resource elements, and/or a coefficient multiplied on each port varies with time domain resource elements.

In an embodiment of the present invention, at least one column in the precoding used is multiplied by the coefficient in the following manner: coefficients multiplied by two columns in the precoding being included in coefficients multiplied by three columns in the precoding, and the coefficients multiplied by three columns in the precoding being included in coefficients multiplied by four columns in the precoding.

In an embodiment of the present invention, a coefficient multiplied by each column in the precoding varies with frequency domain resource elements and/or a coefficient multiplied by each column in the precoding varies with time domain resource elements.

Embodiment Four

The embodiment of the present invention further provides a parameter receiving apparatus which is configured to implement the above-mentioned embodiments and implementations. What has been described will not be repeated. As used below, the term "module" may be software, hardware or a combination thereof capable of implementing predetermined functions. The apparatus in the embodiment described below is preferably implemented by software, but an implementation by hardware or by a combination of software and hardware is also possible and conceivable.

Figure 7:
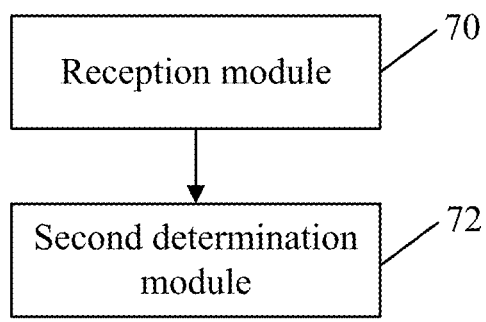
FIG. 7 is a structural diagram of a parameter receiving apparatus according to an embodiment of the present invention.

FIG. 7 is a structural diagram of a parameter receiving apparatus according to an embodiment of the present invention. As shown in FIG. 7, the apparatus includes a reception module 70 and a second determination module 72.

The reception module 70 is configured to receive reference pilot sequence parameters.

The second determination module 72 is configured to determine, according to the reference pilot sequence parameters, an initial value of a reference pilot pseudo-random sequence corresponding to each reference pilot group among M reference pilot groups, where the initial value of the reference pilot pseudo-random sequence is used for generating a pilot pseudo-random sequence of a corresponding reference pilot group, each reference pilot group corresponds to at least one reference pilot port, and M is a positive integer. The second determination module 72 herein is a first determination module in this parameter receiving apparatus.

Through the above steps, reference pilot sequence parameters are received, and an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group. Through the above solution, the problem of excessive PAPR of reference signals caused by the same pilot sequence in the related art can be solved, and thus the PAPR of reference signals can be effectively reduced.

In an embodiment of the present invention, the reference pilot groups include at least one of: a reference pilot port group, a reference pilot CDM group, or a CDM group corresponding to a reference pilot port.

In an embodiment of the present invention, the reference pilot sequence parameters include at least one of: a static identification, a static identification step size, a dynamic identification, a reference pilot group index, and a fallback weight w, where the reference pilot group index includes a reference pilot group absolute index and a reference pilot group relative index.

In an embodiment of the present invention, the method includes at least one of:
  configuring the static identification through high layer signaling;
  configuring the static identification step size through high layer signaling;
  configuring the dynamic identification through physical layer signaling;
  configuring the reference pilot group index through physical layer signaling; or
  configuring the fallback weight w through high layer signaling or physical layer signaling; or
  determining the fallback weight w through the static identification or the dynamic identification.

In an embodiment of the present invention, K static identifications are configured through high layer signaling, and the K static identifications are divided into L static identification groups, where K is a positive even number, and L is an integer greater than 1 and less than K.

In an embodiment of the present invention, the method includes at least one of:
  determining a value of K according to at least one of: the number of the reference pilot groups, the number of transport layers, or a reference pilot type;
  determining a value of L according to the number of the reference pilot groups; or determining the number of static identifications included in one of the static identification groups according to the number of pilot port groups.

In an embodiment of the present invention, the method includes at least one of:
  selecting the static identification group through the dynamic identification and the reference pilot group index;
  selecting the static identification group through the dynamic identification;
  selecting the static identification group through the reference pilot group index; or
  selecting the static identification through the dynamic identification and the reference pilot group index.

In an embodiment of the present invention, the initial value of the reference pilot pseudo-random sequence corresponding to each reference pilot group among the M reference pilot groups is determined according to the reference pilot sequence parameters in at least one of the following manners:
  determining the initial value of the reference pilot pseudo-random sequence corresponding to each reference pilot group among the M reference pilot groups at least according to a static identification and a reference pilot group index;
  determining the initial value of the reference pilot pseudo-random sequence corresponding to each reference pilot group among the M reference pilot groups at least according to a static identification, a reference pilot group index, and a static identification step size;
  determining the initial value of the reference pilot pseudo-random sequence corresponding to each reference pilot group among the M reference pilot groups at least according to a static identification, a reference pilot group index, and a dynamic identification; or
  determining the initial value of the reference pilot pseudo-random sequence corresponding to each reference pilot group among the M reference pilot groups at least according to a static identification, a reference pilot group index, a dynamic identification, and a static identification step size.

In an embodiment of the present invention, the initial value of the reference pilot pseudo-random sequence corresponding to each reference pilot group among the M reference pilot groups is determined according to the reference pilot sequence parameters in at least one of the following manners: determining the initial value of the reference pilot pseudo-random sequence corresponding to each reference pilot group among the M reference pilot groups at least according to a static identification, a reference pilot group index, and a modulo operation; determining the initial value of the reference pilot pseudo-random sequence corresponding to each reference pilot group among the M reference pilot groups at least according to a static identification, a reference pilot group index, a static identification step size, and a modulo operation; determining the initial value of the reference pilot pseudo-random sequence corresponding to each reference pilot group among the M reference pilot groups at least according to a static identification, a reference pilot group index, a dynamic identification, and a modulo operation; or determining the initial value of the reference pilot pseudo-random sequence corresponding to each reference pilot group among the M reference pilot groups at least according to a static identification, a reference pilot group index, a dynamic identification, a static identification step size, and a modulo operation.

In an embodiment of the present invention, the static identification includes a first location static identification and a second location static identification, and the modulo operation includes one of the following operations:
  performing a modulo operation on a calculation result of the static identification and the reference pilot group index;
  performing a modulo operation on a calculation result of the static identification, the reference pilot group index, and the static identification step size;
  performing a modulo operation on a calculation result of the first location static identification and the reference pilot group index;
  performing a modulo operation on a calculation result of the first location static identification, the reference pilot group index, and the static identification step size;
  performing a modulo operation on a calculation result of the second location static identification and the reference pilot group index;
  performing a modulo operation on a calculation result of the second location static identification, the reference pilot group index, and the static identification step size;
  performing a modulo operation on a calculation result of the first location static identification and the reference pilot group index, and performing a modulo operation on a calculation result of the second location static identification and the reference pilot group index;
  performing a modulo operation on a calculation result of the first location static identification, the reference pilot group index, and the static identification step size, and performing a modulo operation on a calculation result of the second location static identification, the reference pilot group index, and the static identification step size;

performing a modulo operation on a calculation result of the static identification, the dynamic identification, and the reference pilot group index;

performing a modulo operation on a calculation result of the static identification, the dynamic identification, the reference pilot group index, and the static identification step size;

performing a modulo operation on a calculation result of the first location static identification, the dynamic identification, and the reference pilot group index;

performing a modulo operation on a calculation result of the second location static identification, the dynamic identification, and the reference pilot group index;

performing a modulo operation on a calculation result of the first location static identification, the dynamic identification, the reference pilot group index, and the static identification step size;

performing a modulo operation on a calculation result of the second location static identification, the dynamic identification, the reference pilot group index, and the static identification step size;

performing a modulo operation on a calculation result of the first location static identification, the dynamic identification, and the reference pilot group index, and performing a modulo operation on a calculation result of the second location static identification, the dynamic identification, and the reference pilot group index; or performing a modulo operation on a calculation result of the first location static identification, the dynamic identification, the reference pilot group index, and the static identification step size, and performing a modulo operation on a calculation result of the second location static identification, the dynamic identification, the reference pilot group index, and the static identification step size.

In an embodiment of the present invention, the reference pilot pseudo-random sequences of the M reference pilot groups include first-type reference pilot pseudo-random sequences and second-type reference pilot pseudo-random sequences, where the first-type reference pilot pseudo-random sequences include sequences whose values are the same among the reference pilot pseudo-random sequences of the M reference pilot groups, and the second-type reference pilot pseudo-random sequences include sequences whose values are different among the reference pilot pseudo-random sequences of the M reference pilot group.

In an embodiment of the present invention, that reference pilot pseudo-random sequences of the M reference pilot groups are first-type reference pilot pseudo-random sequences is determined through at least one of the following: a value of a dynamic identifier being zero; a value of a static identifier step size being zero; a value of a static identifier corresponding to each of the M reference pilot groups being identical to each other; or a value of a fallback weight w being zero.

In an embodiment of the present invention, in response to a reference signal being a DMRS, the terminal receives indication information of precoding or indication information of DMRS ports to perform at least one of the following operations: multiplying at least one column in the precoding used by a coefficient, or multiplying the DMRS on at least one port for transmitting the DMRS by a coefficient, and the terminal is instructed to transmit the DMRS.

In an embodiment of the present invention, the indication information meets at least one of the following conditions:
the DMRS ports indicated by the indication information being one of the following port sets: a port set of DMRS Type 1: {0, 4}, {0, 1, 4}, {0, 1, 4, 5}, {2, 6}, {2, 3, 6}, {2, 3, 6, 7}, or {0, 2, 4, 6}, or a port set of DMRS Type 2: {0, 1, 6}, {0, 1, 6, 7}, {2, 3, 8}, {2, 3, 8, 9}, or {4, 5, 10, 11}; or
precoding codewords indicated by the indication information having one of the following characteristics: all elements in a precoding codeword matrix being non-zero, or in a precoding word matrix, at least one row having two non-zero elements.

In an embodiment of the present invention, the DMRS on the at least one port for transmitting the DMRS is multiplied by the coefficient in the following manner: coefficients multiplied by the DMRS on three ports for transmitting the DMRS being included in coefficients multiplied by the DMRS on four ports for transmitting the DMRS, and coefficients multiplied by the DMRS on two ports for transmitting the DMRS being included in the coefficients multiplied by the DMRS on three ports for transmitting the DMRS.

In an embodiment of the present invention, a coefficient multiplied on each port varies with frequency domain resource elements, and/or a coefficient multiplied on each port varies with time domain resource elements.

In an embodiment of the present invention, at least one column in the precoding used is multiplied by the coefficient in the following manner: coefficients multiplied by two columns in the precoding being included in coefficients multiplied by three columns in the precoding, and the coefficients multiplied by three columns in the precoding being included in coefficients multiplied by four columns in the precoding.

In an embodiment of the present invention, a coefficient multiplied by each column in the precoding varies with frequency domain resource elements and/or a coefficient multiplied by each column in the precoding varies with time domain resource elements.

The following describes the processes of parameter configuration and parameter receiving in conjunction with embodiments that are not intended to limit the solution of embodiments of the present invention.

The reference pilot group involved in the present disclosure may be replaced with the following concepts: reference pilot port group, reference pilot CDM group, CDM group corresponding to a reference pilot port, CDM group, and CDM Group. The reference pilot includes, but is not limited to, CSI-RS, DMRS, and SRS. The reference pilot port refers to a resource element (RE) used for transmitting a reference pilot signal, or an RE group.

In an embodiments of the present invention, the reference pilot group indexes may also be group numbers, numbers, indications or identifications of the reference pilot groups, and the reference pilot group indexes include reference pilot group relative indexes and reference pilot group absolute indexes. The reference pilot group absolute indexes are numbers or indexes of all reference pilot groups from smallest to largest. For example, L reference pilots divided into M reference pilot groups, and then the reference pilot group absolute indexes are reference pilot group 0 to reference pilot group (M−1), where L and M are positive integers. The reference pilot group relative indexes refer to reference pilot group indexes of reference pilot groups assigned to a terminal after these reference pilot groups are reordered according to magnitudes of their reference pilot group absolute indexes. For example, if M' reference pilot groups among the M reference pilot groups are assigned to the terminal, where M' is less than M, the reference pilot group relative indexes are reference pilot group relative index 0 to reference pilot group relative index (M'−1). For example, when M=6 and reference pilot groups assigned to the terminal are {reference pilot group 5, reference pilot group 1}, the relative index of reference pilot group 1 is reference pilot group relative index 0, and the relative index of reference pilot group 5 is reference pilot group relative index 1.

Example One

The example is used for illustrating the generation of CSI-RS sequences when the reference pilot signals are CSI-RSs. The base station generates a reference pilot pseudo-random sequence of each CSI-RS port group through the following equation.

$$r(m) = \frac{1}{\sqrt{2}}(1 - 2 \cdot c(2m)) + j\frac{1}{\sqrt{2}}(1 - 2 \cdot c(2m+1)) \quad (1)$$

In the above equation, the length of c(n) is n=0, 1, ..., $M_{PN}$−1, which is defined, but is not limited to, by:

$$c(n) = (x_1(n + N_C) + x_2(n + N_C)) \bmod 2$$
$$x_1(n + 31) = (x_1(n + 3) + x_1(n)) \bmod 2$$
$$x_2(n + 31) = (x_2(n + 3) + x_2(n + 2) + x_2(n + 1) + x_2(n)) \bmod 2$$

$N_c$=1600, a first sequence $x_1(n)$ is initialized as a sequence $x_1(0)$=1, $x_1(n)$=0, n=1, 2, ..., 30 and a second m-sequence (sequence m) $x_2(n)$ is denoted as $$c_{init} = \sum_{i=0}^{30} x_2(i) \cdot 2^i,$$

where $c_{init}$ is the initial value of the reference pilot pseudo-random sequence.

The base station maps the generated reference pilot pseudo-random sequence onto a pilot port and transmits the reference pilot.

Different CSI-RS pilot port groups correspond to different CDM Groups, respectively, and different CSI-RS pilot groups are orthogonal in the frequency domain or the time domain. In order to generate reference pilot sequences on different CSI-RS port groups, the base station needs to configure reference pilot sequence parameters and determine an initial value of a reference pilot pseudo-random sequence corresponding to each of M reference pilot groups according to the reference pilot sequence parameters, where M is a positive integer, and the reference pilot sequence parameter includes at least one of: a static identification, a static identification step size, or a reference pilot group index.

Similarly, the terminal generates a reference pilot pseudo-random sequence of each CSI-RS port group by using Equation (1), and estimates a channel on the pilot port according to the generated reference pilot pseudo-random sequence. In order to generate reference pilot sequences on different CSI-RS port groups, the terminal needs to receive reference pilot sequence parameters and determine an initial value of a reference pilot pseudo-random sequence corresponding to each of M reference pilot groups according to the reference pilot sequence parameters, where M is a positive integer, and the reference pilot sequence parameter includes at least one of: a static identification, a static identification step size, or a reference pilot group index.

The following illustrates how initial values of the reference pilot pseudo-random sequences are determined based on reference pilot sequence parameters by using several different examples.

Example Two

The example illustrates that the terminal or the base station determines the initial values of CSI-RS pseudo-random sequences based on the reference pilot sequence parameters.

The base station or the terminal determines the initial value of a CSI-RS pseudo-random sequence in the following manner.

The initial value of the reference pilot pseudo-random sequence corresponding to each reference pilot group of M reference pilot groups is determined at least according to a static identification and a reference pilot group index. The initial value of a reference pilot pseudo-random sequence corresponding to an $(n_{cdm})^{th}$ CSI-RS pilot group is determined through one of the following equations:

$$c_{init}(n_{cdm}) = \left(2^{10} \cdot \left(14n_{s,f}^{\mu} + l + 1\right)(2(n_{ID} + n_{cdm}) + 1) + n_{ID}\right) \bmod 2^{31}, \text{ or}$$

$$c_{init}(n_{cdm}) = \left(2^{10} \cdot \left(14n_{s,f}^{\mu} + l + 1\right)(2n_{ID} + 1) + (n_{ID} + n_{cdm})\right) \bmod 2^{31}, \text{ or}$$

$$c_{init}(n_{cdm}) = \left(2^{10} \cdot \left(14n_{s,f}^{\mu} + l + 1\right)(2(n_{ID} + n_{cdm}) + 1) + (n_{ID} + n_{cdm})\right) \bmod 2^{31}.$$

Alternatively, the initial value of the reference pilot pseudo-random sequence corresponding to each reference pilot group of M reference pilot groups is determined at least according to a static identification, a reference pilot group index, and a modulo operation. The initial value of a reference pilot pseudo-random sequence corresponding to an $(n_{cdm})^{th}$ CSI-RS pilot group is determined in one of the following manners (a), (b), (c) and (d).

(a) A modulo operation is carried out on a calculation result of a first location static identification and a reference pilot group index by using, but not limited to, one of the following equations:

$$c_{init}(n_{cdm}) = \left(2^{10} \cdot \left(14n_{s,f}^{\mu} + l + 1\right)\left(2(n_{ID} + n_{cdm}) \bmod 2^{k0} + 1\right) + n_{ID}\right) \bmod 2^{31},$$

$$c_{init}(n_{cdm}) =$$
$$\left(2^{10} \cdot \left(14n_{s,f}^{\mu} + l + 1\right)\left(2(n_{ID} + n_{cdm}) \bmod 2^{k0} + 1\right) + (n_{ID} + n_{cdm})\right) \bmod 2^{31},$$

$$c_{init}(n_{cdm}) =$$
$$\left(2^{10} \cdot \left(14n_{s,f}^{\mu} + l + 1\right)\left((2(n_{ID} + n_{cdm}) + 1) \bmod 2^{k2}\right) + n_{ID}\right) \bmod 2^{31}, \text{ or}$$

$$c_{init}(n_{cdm}) =$$
$$\left(2^{10} \cdot \left(14n_{s,f}^{\mu} + l + 1\right)\left((2(n_{ID} + n_{cdm}) + 1) \bmod 2^{k2}\right) + (n_{ID} + n_{cdm})\right) \bmod 2^{31}.$$

(b) A modulo operation is carried out on a calculation result of a second location static identification and a reference pilot group index by using, but not limited to, one of the following equations:

$$c_{init}(n_{cdm}) =$$

$$\left(2^{10} \cdot \left(14 n_{s,f}^{\mu} + l + 1\right)(2(n_{ID} + n_{cdm}) + 1) + (n_{ID} + n_{cdm}) \bmod 2^{k1}\right) \bmod 2^{31}, \text{ or}$$

$$c_{init}(n_{cdm}) = \left(2^{10} \cdot \left(14 n_{s,f}^{\mu} + l + 1\right)(2 n_{ID} + 1) + (n_{ID} + n_{cdm}) \bmod 2^{k1}\right) \bmod 2^{31}.$$

(c) A modulo operation is carried out on a calculation result of a first location static identification and a reference pilot group index and on a calculation result of the second location static identification and the reference pilot group index by using, but not limited to, one of the following equations:

$$c_{init}(n_{cdm}) = \left(2^{10} \cdot \left(14 n_{s,f}^{\mu} + l + 1\right)\left(2(n_{ID} + n_{cdm}) \bmod 2^{k0} + 1\right) +$$

$$(n_{ID} + n_{cdm}) \bmod 2^{k1}\right) \bmod 2^{31}, \text{ or}$$

$$c_{init}(n_{cdm}) = \left(2^{10} \cdot \left(14 n_{s,f}^{\mu} + l + 1\right)\left((2(n_{ID} + n_{cdm}) + 1) \bmod 2^{k2}\right) +$$

$$(n_{ID} + n_{cdm}) \bmod 2^{k1}\right) \bmod 2^{31}.$$

(d) A modulo operation may be carried out on a calculation result of a static identification and a reference pilot group index by using, but not limited to, any one of equations in (a), (b) or (c) in this example.

In the above equations, $n_{s,f}^{\mu}$ is a slot index number of a radio frame, l is an orthogonal frequency division multiplexing (OFDM) symbol index number on a slot, and $n_{ID}$ is the static identification. The base station configures $n_{ID}$ to the terminal through high layer signaling, for example, the scrambling ID of the high layer signaling, and the terminal obtains $n_{ID}$ by receiving the high layer signaling. $n_{cdm}$ is a reference pilot group index, or a CDM group index corresponding to a reference pilot, or a CDM group index.

$(n \cdot) \bmod 2^k$ denotes a modulo operation on the identification $(\cdot)$, where k0, k1, and k2, as the values of k, are parameters configured by high layer signaling or parameters agreed by the terminal and the base station and are all positive integers. In an embodiment, k0 is 9, k1 is 9, and k2 is 10.

The first location static identification and the second location static identification refer to the first static identification and the second static identification appearing in the generation equation of the initial value $c_{init}$ ($n_{cdm}$) of the reference sequence from left to right, respectively.

In this way, the reference pilot pseudo-random sequences corresponding to different reference pilot groups may generate different sequences (referred to as second-type reference pilot pseudo-random sequences) because initial values of the reference pilot pseudo-random sequences are different, so that signals of different reference pilot ports on the same symbol form a relatively small PAPR in the time domain and such a PAPR is within an acceptable range. However, since there are low-version users, when the initial values of the reference pilot pseudo-random sequences of different reference pilot groups are the same (referred to as the first-type reference pilot pseudo-random sequences), if both the low-version user and the high-version user perform multiplexing, an error may occur when the low-version user performs interference estimation on the high-version user. Therefore, in order to solve this problem, the high-version user needs to fall back to the case that the reference pilot sequences corresponding to different reference pilot groups are the same, that is, the reference pilot pseudo-random sequences of the M reference pilot groups are determined as the first-type reference pilot pseudo-random sequences through the following information:

the values of the static identifiers corresponding to the M reference pilot groups being identical to each other (that is, values of $n_{cdm}$ corresponding to different reference pilot groups are identical to each other).

Example Three

The example illustrates that the terminal or the base station determines the initial values of CSI-RS pseudo-random sequences based on the reference pilot sequence parameters.

The base station or the terminal determines the initial value of a CSI-RS pseudo-random sequence in the following manner.

The initial value of the reference pilot pseudo-random sequence corresponding to each reference pilot group of M reference pilot groups is determined at least according to a static identification, a reference pilot group index, and a static identification step size.

The initial value of a reference pilot pseudo-random sequence corresponding to an $(n_{cdm})^{th}$ CSI-RS pilot group is determined through one of the following equations:

$$c_{init}(n_{cdm}) = \left(2^{10} \cdot \left(14 n_{s,f}^{\mu} + l + 1\right)(2(n_{ID} + K \times n_{cdm}) + 1) + n_{ID}\right) \bmod 2^{31}, \text{ or}$$

$$c_{init}(n_{cdm}) = \left(2^{10} \cdot \left(14 n_{s,f}^{\mu} + l + 1\right)(2 n_{ID} + 1) + (n_{ID} + K \times n_{cdm})\right) \bmod 2^{31}, \text{ or}$$

$$c_{init}(n_{cdm}) =$$

$$\left(2^{10} \cdot \left(14 n_{s,f}^{\mu} + l + 1\right)(2(n_{ID} + K \times n_{cdm}) + 1) + (n_{ID} + K \times n_{cdm})\right) \bmod 2^{31}.$$

Alternatively, the initial value of the reference pilot pseudo-random sequence corresponding to each reference pilot group of M reference pilot groups is determined at least according to a static identification, a reference pilot group index, a static identification step size, and a modulo operation. The initial value of a reference pilot pseudo-random sequence corresponding to an $(n_{cdm})^{th}$ CSI-RS pilot group is determined in one of the following manners (a), (b), (c) and (d).

(a) A modulo operation is carried out on a calculation result of a first location static identification, a reference pilot group index, and a static identification step size by using, but not limited to, one of the following equations:

$$c_{init}(n_{cdm}) =$$

$$\left(2^{10} \cdot \left(14 n_{s,f}^{\mu} + l + 1\right)\left(2(n_{ID} + K \times n_{cdm}) \bmod 2^{k0} + 1\right) + n_{ID}\right) \bmod 2^{31},$$

$$c_{init}(n_{cdm}) =$$

$$\left(2^{10} \cdot \left(14 n_{s,f}^{\mu} + l + 1\right)\left(2(n_{ID} + K \times n_{cdm}) \bmod 2^{k0} + 1\right) + (n_{ID} + n_{cdm})\right) \bmod 2^{31},$$

$$c_{init}(n_{cdm}) =$$

$$\left(2^{10} \cdot \left(14 n_{s,f}^{\mu} + l + 1\right)\left((2(n_{ID} + K \times n_{cdm}) + 1) \bmod 2^{k2}\right) + n_{ID}\right) \bmod 2^{31}, \text{ or}$$

$$c_{init}(n_{cdm}) = \left(2^{10} \cdot \left(14 n_{s,f}^{\mu} + l + 1\right)\left((2(n_{ID} + K \times n_{cdm}) + 1) \bmod 2^{k2}\right) +$$

$$(n_{ID} + n_{cdm})\right) \bmod 2^{31}.$$

(b) A modulo operation is carried out on a calculation result of a second location static identification, a reference pilot group index, and a static identification step size by using, but not limited to, one of the following equations:

$$c_{init}(n_{cdm}) = (2^{10} \cdot (14n_{s,f}^{\mu} + l + 1)(2(n_{ID} + K \times n_{cdm}) + 1) +$$

$$(n_{ID} + K \times n_{cdm}) \bmod 2^{k1}) \bmod 2^{31}$$

, or $$c_{init}(n_{cdm}) =$$

$$(2^{10} \cdot (14n_{s,f}^{\mu} + l + 1)(2n_{ID} + 1) + (n_{ID} + K \times n_{cdm}) \bmod 2^{k1}) \bmod 2^{31}.$$

(c) A modulo operation is carried out on a calculation result of a first location static identification, a reference pilot group index, and a static identification step size and on a calculation result of a second location static identification, a reference pilot group index, and a static identification step size by using, but not limited to, one of the following equations:

$$c_{init}(n_{cdm}) = (2^{10} \cdot (14n_{s,f}^{\mu} + l + 1)(2(n_{ID} + K \times n_{cdm}) \bmod 2^{k0} + 1) +$$

$$(n_{ID} + K \times n_{cdm}) \bmod 2^{k1}) \bmod 2^{31}$$

, or $$c_{init}(n_{cdm}) = (2^{10} \cdot (14n_{s,f}^{\mu} + l + 1)((2(n_{ID} + K \times n_{cdm}) + 1) \bmod 2^{k2}) +$$

$$(n_{ID} + K \times n_{cdm}) \bmod 2^{k1}) \bmod 2^{31}.$$

(d) A modulo operation may be carried out on a calculation result of a static identification and a reference pilot group index by using, but not limited to, any one of equations in (a), (b) or (c) in this example.

In the above equations, $n_{s,f}^{\mu}$ is a slot index number of a radio frame, l is an OFDM symbol index number on a slot, and $n_{ID}$ is the static identification. The base station configures $n_{ID}$ to the terminal through high layer signaling, for example, the scrambling ID of the high layer signaling, and the terminal obtains $n_{ID}$ by receiving the high layer signaling. $n_{cdm}$ is a reference pilot group index, or a CDM group index corresponding to a reference pilot, or a CDM group index.

(n·)mod $2^k$ denotes a modulo operation on the identification (·), where k0, k1, and k2, as the values of k, are parameters configured by high layer signaling or parameters agreed by the terminal and the base station and are all positive integers. In an embodiment, k0 is 9, k1 is 9, and k2 is 10.

The first location static identification and the second location static identification refer to the first static identification and the second static identification appearing in the generation equation of the initial value $c_{init}$ ($n_{cdm}$) of the reference sequence from left to right, respectively.

K is the static identification step size, is configured through high layer signaling or agreed by the terminal and the base station, and is a nonnegative integer. In an embodiment, K is 0 or $2^m$, where m is a positive integer.

In this way, the reference pilot pseudo-random sequences corresponding to different reference pilot groups may generate different sequences (referred to as second-type reference pilot pseudo-random sequences) because initial values of the reference pilot pseudo-random sequences are different, so that signals of different reference pilot ports on the same symbol form a relatively small PAPR in the time domain and such a PAPR is within the acceptable range. However, since there are low-version users, when the initial values of the reference pilot pseudo-random sequences of different reference pilot groups are the same (referred to as the first-type reference pilot pseudo-random sequences), if both the low-version user and the high-version user perform multiplexing, an error may occur when the low-version user performs interference estimation on the high-version user. Therefore, in order to solve this problem, the high-version user needs to be back off to the case that the reference pilot sequences corresponding to different reference pilot groups are the same, that is, the reference pilot pseudo-random sequences of the M reference pilot groups are determined as the first-type reference pilot pseudo-random sequences through at least one of the following:

the value of a static identification step size being zero (that is, K=0); or the values of static identifiers corresponding to the M reference pilot groups being identical to each other (that is, values of $n_{cdm}$ corresponding to different reference pilot groups are identical to each other).

Example Four

The example is used for illustrating the generation of DMRS sequences when the reference pilot signals are DMRSs.

The base station generates a reference pilot pseudo-random sequence of each DMRS port group by using Equation (1) in Example one, maps the generated reference pilot pseudo-random sequence onto a pilot port, and sends the reference pilot.

Different DMRS pilot port groups correspond to different CDM Groups, respectively, and different DMRS pilot groups are orthogonal in the frequency domain or the time domain. In order to generate reference pilot sequences on different DMRS port groups, the base station needs to configure reference pilot sequence parameters and determine an initial value of a reference pilot pseudo-random sequence corresponding to each of M reference pilot groups according to the reference pilot sequence parameters, where M is a positive integer, and the reference pilot sequence parameter includes at least one of: a static identification, a static identification step size, a reference pilot group index, or a dynamic identification.

Similarly, the terminal generates a reference pilot pseudo-random sequence of each DMRS port group by using Equation (1) in Example one, and estimates a channel on the pilot port according to the generated reference pilot pseudo-random sequence. In order to generate reference pilot sequences on different DMRS port groups, the terminal needs to receive reference pilot sequence parameters and determine an initial value of a reference pilot pseudo-random sequence corresponding to each of M reference pilot groups according to the reference pilot sequence parameters, where M is a positive integer, and the reference pilot sequence parameter includes at least one of: a static identification, a static identification step size, a reference pilot group index, or a dynamic identification.

The following illustrates how initial values of the reference pilot pseudo-random sequences are determined based on reference pilot sequence parameters by using several different examples.

Example Five

The example illustrates that the terminal or the base station determines the initial values of DMRS Type1 pseudo-random sequences based on the reference pilot sequence parameters.

The base station or the terminal determines the initial value of a DMRS pseudo-random sequence in the following manner.

The initial value of the reference pilot pseudo-random sequence corresponding to each reference pilot group of M reference pilot groups is determined at least according to a static identification, a dynamic identification, and a reference pilot group index. The initial value of a reference pilot pseudo-random sequence corresponding to an $(n_{cdm})^{th}$ DMRS pilot group is determined in one of the following equations:

$$C_{init}(n_{cdm}) = \left(2^{17}\left(N_{symb}^{slot}n_{s,f}^{\mu} + l + 1\right)\left(2N_{ID}^{(n_{SCID}+n_{cdm})\bmod 2} + 1\right) + 2N_{ID}^{n_{SCID}} + n_{SCID}\right)\bmod 2^{31}, \text{ or}$$

$$C_{init}(n_{cdm}) = \left(2^{17}\left(N_{symb}^{slot}n_{s,f}^{\mu} + l + 1\right)\left(2N_{ID}^{n_{SCID}} + 1\right) + 2N_{ID}^{(n_{SCID}+n_{cdm})\bmod 2} + n_{SCID}\right)\bmod 2^{31}, \text{ or}$$

$$C_{init}(n_{cdm}) = \left(2^{17}\left(N_{symb}^{slot}n_{s,f}^{\mu} + l + 1\right)\left(2N_{ID}^{(n_{SCID}+n_{cdm})\bmod 2} + 1\right) + 2N_{ID}^{(n_{SCID}+n_{cdm})\bmod 2} + n_{SCID}\right)\bmod 2^{31}.$$

In the above equations, $N_{symb}^{slot}$ denotes the number of symbols in one slot, whose value is generally 14, $n_{s,f}^{\mu}$ is a slot index number of a radio frame, l is an OFDM symbol index number on a slot, and $n_{NCID}$ is the dynamic identification which is generally configured through the DMRS sequence initialization of physical downlink control signaling and whose value is 0 or 1. $N_{ID}^{n_{SCID}} \in \{0, 1, \ldots, 65535\}$ is the static identification, and the base station configures $N_{ID}^{n_{SCID}}$ to the terminal through the high layer signaling, for example, using the Uplink-Demodulation Reference Signal-Scrambling-ID (UL-DMRS-Scrambling-ID) of the high layer signaling for an uplink DMRS or using the Downlink-Demodulation Reference Signal-Scrambling-ID (DL-DMRS-VID Scrambling-ID) of the high layer signaling for a downlink DMRS, and the terminal obtains $N_{ID}^{n_{SCID}}$ by receiving the high layer signaling. However, generally, since the high layer signaling would configure at least two static identifications, for example, static identifications $N_{ID}^{0}$ and $N_{ID}^{1}$, at least one of the dynamic identification and the reference pilot group index is required to select one of the at least two static identifications. $n_{cdm}$ is a reference pilot group index, or a CDM group index corresponding to a reference pilot, or a CDM group index.

In this way, the reference pilot pseudo-random sequences corresponding to different reference pilot groups may generate different sequences (referred to as second-type reference pilot pseudo-random sequences) because initial values of the reference pilot pseudo-random sequences are different, so that signals of different reference pilot ports on the same symbol form a relatively small PAPR in the time domain and such a PAPR is within the acceptable range. However, since there are low-version users, when the initial values of the reference pilot pseudo-random sequences of different reference pilot groups are the same (referred to as the first-type reference pilot pseudo-random sequences), if both the low-version user and the high-version user perform multiplexing, an error may occur when the low-version user performs interference estimation on the high-version user. Therefore, in order to solve this problem, the high-version user needs to be back off to the case that the reference pilot sequences corresponding to different reference pilot groups are the same, that is, the reference pilot pseudo-random sequences of the M reference pilot groups are determined as the first-type reference pilot pseudo-random sequences through the following information:

the values of static identifiers corresponding to the M reference pilot groups being identical to each other (that is, values of $n_{cdm}$ corresponding to different reference pilot groups are identical to each other).

Example Six

The example illustrates that the terminal or the base station determines the initial values of DMRS Type1 or DMRS Type2 pseudo-random sequences based on the reference pilot sequence parameters.

The base station or the terminal determines the initial value of a DMRS pseudo-random sequence in the following manner.

The initial value of the reference pilot pseudo-random sequence corresponding to each reference pilot group of M reference pilot groups is determined at least according to a static identification, a dynamic identification, and a reference pilot group index. The initial value of a reference pilot pseudo-random sequence corresponding to an $(n_{cdm})^{th}$ DMRS pilot group is determined in one of the following equations:

$$C_{init}(n_{cdm}) =$$
$$\left(2^{17}\left(N_{symb}^{slot}n_{s,f}^{\mu} + l + 1\right)\left(2\left(N_{ID}^{n_{SCID}} + n_{cdm}\right) + 1\right) + 2N_{ID}^{n_{SCID}} + n_{SCID}\right)\bmod 2^{31}, \text{ or}$$

$$C_{init}(n_{cdm}) =$$
$$\left(2^{17}\left(N_{symb}^{slot}n_{s,f}^{\mu} + l + 1\right)\left(2N_{ID}^{n_{SCID}} + 1\right) + 2\left(N_{ID}^{n_{SCID}} + n_{cdm}\right) + n_{SCID}\right)\bmod 2^{31}, \text{ or}$$

$$C_{init}(n_{cdm}) =$$
$$\left(2^{17}\left(N_{symb}^{slot}n_{s,f}^{\mu} + l + 1\right)\left(2\left(N_{ID}^{n_{SCID}} + n_{cdm}\right) + 1\right) + 2\left(N_{ID}^{n_{SCID}} + n_{cdm}\right) + n_{SCID}\right)$$
$$\bmod 2^{31}.$$

Alternatively, the initial value of the reference pilot pseudo-random sequence corresponding to each reference pilot group of M reference pilot groups is determined at least according to a static identification, a dynamic identification, a reference pilot group index, and a modulo operation. The initial value of a reference pilot pseudo-random sequence corresponding to an $(n_{cdm})^{th}$ DMRS pilot group is determined in one of the following manners (a), (b), (c) and (d).

(a) A modulo operation is carried out on a calculation result of a first location static identification, a dynamic identification, and a reference pilot group index by using, but not limited to, one of the following equations:

$$C_{init}(n_{cdm}) =$$
$$\left(2^{17}\left(N_{symb}^{slot}n_{s,f}^{\mu} + l + 1\right)\left(2\left(N_{ID}^{n_{SCID}} + n_{cdm}\right)\bmod 2^{k0} + 1\right) + 2N_{ID}^{n_{SCID}} + n_{SCID}\right)$$
$$\bmod 2^{31},$$

$$C_{init}(n_{cdm}) = \left(2^{17}\left(N_{symb}^{slot}n_{s,f}^{\mu} + l + 1\right)\left(2\left(N_{ID}^{n_{SCID}} + n_{cdm}\right)\bmod 2^{k0} + 1\right) + 2\left(N_{ID}^{n_{SCID}} + n_{SCID}\right)\bmod 2^{31},$$

$$C_{init}(n_{cdm}) =$$
$$\left(2^{17}\left(N_{symb}^{slot}n_{s,f}^{\mu} + l + 1\right)\left(2\left(N_{ID}^{n_{SCID}} + n_{cdm}\right) + 1\right)\bmod 2^{k2} + 2N_{ID}^{n_{SCID}} + n_{SCID}\right)$$

-continued $$C_{init}(n_{cdm}) = \left(2^{17}\left(N_{symb}^{slot}n_{s,f}^{\mu}+l+1\right)\left(2\left(N_{ID}^{nSCID}+n_{cdm}\right)+1\right)\bmod 2^{k2} + 2\left(N_{ID}^{nSCID}+n_{cdm}\right)+n_{SCID}\right)\bmod 2^{31}.$$

(b) A modulo operation is carried out on a calculation result of a second location static identification, a dynamic identification, and a reference pilot group index by using, but not limited to, one of the following equations:

$$C_{init}(n_{cdm}) = \left(2^{17}\left(N_{symb}^{slot}n_{s,f}^{\mu}+l+1\right)\left(2\left(N_{ID}^{nSCID}+n_{cdm}\right)+1\right) + 2\left(N_{ID}^{nSCID}+n_{cdm}\right)\bmod 2^{k1}+n_{SCID}\right)\bmod 2^{31}, \text{ or}$$

$$C_{init}(n_{cdm}) = \left(2^{17}\left(N_{symb}^{slot}n_{s,f}^{\mu}+l+1\right)\left(2N_{ID}^{nSCID}+1\right) + 2\left(N_{ID}^{nSCID}+n_{cdm}\right)\bmod 2^{k1}+n_{SCID}\right)\bmod 2^{31}.$$

(c) A modulo operation is carried out on a calculation result of a first location static identification, a dynamic identification, and a reference pilot group index and on a calculation result of a second location static identification, a dynamic identification, and a reference pilot group index by using, but not limited to, one of the following equations:

$$C_{init}(n_{cdm}) = \left(2^{17}\left(N_{symb}^{slot}n_{s,f}^{\mu}+l+1\right)\left(2\left(N_{ID}^{nSCID}+n_{cdm}\right)+1\right)\bmod 2^{k2} + 2\left(N_{ID}^{nSCID}+n_{cdm}\right)\bmod 2^{k1}+n_{SCID}\right)\bmod 2^{31}, \text{ or}$$

$$C_{init}(n_{cdm}) = \left(2^{17}\left(N_{symb}^{slot}n_{s,f}^{\mu}+l+1\right)\left(2\left(N_{ID}^{nSCID}+n_{cdm}\right)\bmod 2^{k0}+1\right) + 2\left(N_{ID}^{nSCID}+n_{cdm}\right)\bmod 2^{k1}+n_{SCID}\right)\bmod 2^{31}.$$

(d) A modulo operation may be carried out on a calculation result of a static identification, a dynamic identification, and a reference pilot group index by using, but not limited to, any one of equations in (a), (b) or (c) in this example.

Alternatively, the initial value of the reference pilot pseudo-random sequence corresponding to each reference pilot group of M reference pilot groups is determined at least according to a static identification, a dynamic identification, a reference pilot group index, and a fallback weight w. The initial value of a reference pilot pseudo-random sequence corresponding to an $(n_{cdm})^{th}$ DMRS pilot group is determined in one of the following equations:

$$C_{init}(n_{cdm}) = \left(2^{17}\left(N_{symb}^{slot}n_{s,f}^{\mu}+l+1\right)\left(2N_{ID}^{(nSCID+n_{cdm})\bmod 2}+1\right) + 2\left(N_{ID}^{(nSCID+n_{cdm})\bmod 2}+w\lfloor n_{cdm}/2\rfloor\right)+n_{SCID}\right)\bmod 2^{31}, \text{ or}$$

$$C_{init}(n_{cdm}) = \left(2^{17}\left(N_{symb}^{slot}n_{s,f}^{\mu}+l+1\right)\left(2N_{ID}^{(nSCID+n_{cdm})\bmod 2}+1\right) + 2\left(N_{ID}^{(nSCID+n_{cdm})\bmod 2}+w\lfloor n_{cdm}/2\rfloor\right)\bmod 2^{k}+n_{SCID}\right)\bmod 2^{31}.$$

In the above equations, $N_{symb}^{slot}$ denotes the number of symbols in one slot, whose value is generally 14, $n_{s,f}^{\mu}$ is a slot index number of a radio frame, l is an OFDM symbol index number on a slot, and $n_{SCID}$ is the dynamic identification which is generally configured through the DMRS sequence initialization of physical downlink control signaling and whose value is 0 or 1. $N_{ID}^{nSCID} \in \{0, 1, \ldots, 65535\}$ is the static identification, and the base station configures $N_{ID}^{nSCID}$ to the terminal through the high layer signaling, for example, using the UL-DMRS-Scrambling-ID of the high layer signaling for an uplink DMRS or using the DL-DMRS-Scrambling-ID of the high layer signaling for a downlink DMRS, and the terminal obtains $N_{ID}^{nSCID}$ by receiving the high layer $N_{ID}^{nSCID}$ signaling. However, generally, since the high layer signaling would configure at least two static identifications, for example, static identifications $N_{ID}^{0}$ and $N_{ID}^{1}$, at least one of the dynamic identification and the reference pilot group index is required to select one of the at least two static identifications. $n_{cdm}$ is a reference pilot group index, or a CDM group index corresponding to a reference pilot, or a CDM group index.

(n·)mod 24 denotes a modulo operation on the identification (·), where k0, k1, and k2, as the values of k, are parameters configured by high layer signaling or parameters agreed by the terminal and the base station and are all positive integers. In an embodiment, k0 is 16, k1 is 16, and k2 is 17.

The first location static identification and the second location static identification refer to the first static identification and the second static identification appearing in the generation equation of the initial value $c_{init}(n_{cdm})$ of the reference sequence from left to right, respectively.

In this way, the reference pilot pseudo-random sequences corresponding to different reference pilot groups may generate different sequences (referred to as second-type reference pilot pseudo-random sequences) because initial values of the reference pilot pseudo-random sequences are different, so that signals of different reference pilot ports on the same symbol form a relatively small PAPR in the time domain and such a PAPR is within the acceptable range. However, since there are low-version users, when the initial values of the reference pilot pseudo-random sequences of different reference pilot groups are the same (referred to as the first-type reference pilot pseudo-random sequences), if both the low-version user and the high-version user perform multiplexing, there may be an error when the low-version user performs interference estimation on the high-version user. Therefore, in order to solve this problem, the high-version user needs to be back off to the case that the reference pilot sequences corresponding to different reference pilot groups are the same, that is, the reference pilot pseudo-random sequences of the M reference pilot groups are determined as the first-type reference pilot pseudo-random sequences through at least one of the following:

the values of static identifiers corresponding to the M reference pilot groups being identical to each other (that is, values of corresponding to different reference pilot groups are identical to each other); or a value of the fallback weight w being 0. The fallback identification may take 0 when the value of the dynamic identification is 0 or take 0 when a difference of values of static identifications corresponding to M reference pilot groups is less than a positive integer T (for example, dynamic identification of a first reference pilot group—dynamic identification of a second reference pilot group<T).

Example Seven

The example illustrates that the terminal or the base station determines the initial values of DMRS Type1 or DMRS Type2 pseudo-random sequences based on the reference pilot sequence parameters.

The base station or the terminal determines the initial value of a DMRS pseudo-random sequence in the following manner.

The initial value of the reference pilot pseudo-random sequence corresponding to each reference pilot group of M reference pilot groups is determined at least according to a static identification, a dynamic identification, a reference pilot group index, and a static identification step size. The initial value of a reference pilot pseudo-random sequence corresponding to an $(n_{cdm})^{th}$ DMRS pilot group is determined in one of the following equations:

$$C_{init}(n_{cdm}) =$$
$$\left(2^{17}\left(N_{symb}^{slot}n_{s,f}^{\mu} + l + 1\right)\left(2\left(N_{ID}^{nSCID} + K^1 \times n_{cdm}\right) + 1\right) + 2N_{ID}^{nSCID} + n_{SCID}\right)$$
$$\mod 2^{31}, \text{ or}$$

$$C_{init}(n_{cdm}) =$$
$$\left(2^{17}\left(N_{symb}^{slot}n_{s,f}^{\mu} + l + 1\right)\left(2N_{ID}^{nSCID} + 1\right) + 2\left(N_{ID}^{nSCID} + K^1 \times n_{cdm}\right) + n_{SCID}\right)$$
$$\mod 2^{31}, \text{ or}$$

$$C_{init}(n_{cdm}) = \left(2^{17}\left(N_{symb}^{slot}n_{s,f}^{\mu} + l + 1\right)\left(2\left(N_{ID}^{nSCID} + K^1 \times n_{cdm}\right) + 1\right) + 2\left(N_{ID}^{nSCID} + K^1 \times n_{cdm}\right) + n_{SCID}\right)\mod 2^{31}.$$

Alternatively, the initial value of the reference pilot pseudo-random sequence corresponding to each reference pilot group of M reference pilot groups is determined at least according to a static identification, a dynamic identification, a reference pilot group index, and a modulo operation. The initial value of a reference pilot pseudo-random sequence corresponding to an $(n_{cdm})^{th}$ DMRS pilot group is determined in one of the following manners (a), (b), (c) and (d)

(a) A modulo operation is carried out on a calculation result of a first location static identification, a dynamic identification, a reference pilot group index, and a static identification step size by using, but not limited to, one of the following equations:

$$C_{init}(n_{cdm}) =$$
$$\left(2^{17}\left(N_{symb}^{slot}n_{s,f}^{\mu} + l + 1\right)\left(2\left(N_{ID}^{nSCID} + K^1 \times n_{cdm}\right)\mod 2^{k0} + 1\right) + 2N_{ID}^{nSCID} + n_{SCID}\right)\mod 2^{31},$$

$$C_{init}(n_{cdm}) = \left(2^{17}\left(N_{symb}^{slot}n_{s,f}^{\mu} + l + 1\right)\left(2\left(N_{ID}^{nSCID} + K^1 \times n_{cdm}\right)\mod 2^{k0} + 1\right) + 2\left(N_{ID}^{nSCID} + K^1 \times n_{cdm}\right) + n_{SCID}\right)\mod 2^{31},$$

$$C_{init}(n_{cdm}) =$$
$$\left(2^{17}\left(N_{symb}^{slot}n_{s,f}^{\mu} + l + 1\right)\left(2\left(N_{ID}^{nSCID} + K^1 \times n_{cdm}\right) + 1\right)\mod 2^{k2} + 2N_{ID}^{nSCID} + n_{SCID}\right)\mod 2^{31}, \text{ or}$$

$$C_{init}(n_{cdm}) = \left(2^{17}\left(N_{symb}^{slot}n_{s,f}^{\mu} + l + 1\right)\left(2\left(N_{ID}^{nSCID} + K^1 \times n_{cdm}\right) + 1\right)\mod 2^{k2} + 2\left(N_{ID}^{nSCID} + K^1 \times n_{cdm}\right) + n_{SCID}\right)\mod 2^{31}.$$

(b) A modulo operation is carried out on a calculation result of a second location static identification, a dynamic identification, a reference pilot group index, and a static identification step size by using, but not limited to, one of the following equations:

$$C_{init}(n_{cdm}) = \left(2^{17}\left(N_{symb}^{slot}n_{s,f}^{\mu} + l + 1\right)\left(2\left(N_{ID}^{nSCID} + n_{cdm}\right) + 1\right) + 2\left(N_{ID}^{nSCID} + K^1 \times n_{cdm}\right)\mod 2^{k1} + n_{SCID}\right)\mod 2^{31}, \text{ or}$$

$$C_{init}(n_{cdm}) = \left(2^{17}\left(N_{symb}^{slot}n_{s,f}^{\mu} + l + 1\right)\left(2N_{ID}^{nSCID} + 1\right) + 2\left(N_{ID}^{nSCID} + K^1 \times n_{cdm}\right)\mod 2^{k1} + n_{SCID}\right)\mod 2^{31}.$$

(c) A modulo operation is carried out on a calculation result of a first location static identification, a dynamic identification, a reference pilot group index, and a static identification step size and on a calculation result of a second location static identification, a dynamic identification, a reference pilot group index, and a static identification step size by using, but not limited to, one of the following equations:

$$C_{init}(n_{cdm}) = \left(2^{17}\left(N_{symb}^{slot}n_{s,f}^{\mu} + l + 1\right)\left(2\left(N_{ID}^{nSCID} + K^1 \times n_{cdm}\right) + 1\right)\mod 2^{k2} + 2\left(N_{ID}^{nSCID} + K^1 \times n_{cdm}\right)\mod 2^{k1} + n_{SCID}\right)\mod 2^{31}, \text{ or}$$

$$C_{init}(n_{cdm}) = \left(2^{17}\left(N_{symb}^{slot}n_{s,f}^{\mu} + l + 1\right)\left(2\left(N_{ID}^{nSCID} + K^1 \times n_{cdm}\right)\mod 2^{k0} + 1\right) + 2\left(N_{ID}^{nSCID} + K^1 \times n_{cdm}\right)\mod 2^{k1} + n_{SCID}\right)\mod 2^{31}.$$

(d) A modulo operation may be carried out on a calculation result of a static identification, a dynamic identification, a reference pilot group index, and a static identification step size by using, but not limited to, any one of equations in (a), (b) or (c) in this example.

In the above equations, $N_{symb}^{slot}$ denotes the number of symbols in one slot, whose value is generally 14, $n_{s,f}^{\mu}$ is a slot index number of a radio frame, l is an OFDM symbol index number on a slot, and $n_{SCID}$ is the dynamic identification which is generally configured through the DMRS sequence initialization of physical downlink control signaling and whose value is 0 or 1. $N_{ID}^{nSCID} \in \{0, 1, \ldots, 65535\}$ is the static identification, and the base station configures $N_{ID}^{nSCID}$ to the terminal through the high layer signaling, for example, using the UL-DMRS-Scrambling-ID of the high layer signaling for an uplink DMRS or using the DL-DMRS-Scrambling-ID of the high layer signaling for a downlink DMRS, and the terminal obtains $N_{ID}^{nSCID}$ ID by receiving the high layer signaling. However, generally, since the high layer signaling would configure at least two static identifications, for example, static identifications $N_{ID}^0$ and $N_{ID}^1$, at least one of the dynamic identification and the reference pilot group index is required to select one of the at least two static identifications. $n_{cdm}$ is a reference pilot group index or a CDM group index corresponding to a reference pilot or a CDM group index. $K^1$ includes, but is not limited to, a value of one of the following: a static identification step size K, a dynamic identification $n_{SCID}$, or a product, $n_{SCID}*K$, of the dynamic identification and the static identification.

$(n \cdot)\mod 2^k$ denotes a modulo operation on the identification $(\cdot)$, where k0, k1, and k2, as the values of k, are parameters configured by high layer signaling or parameters agreed by the terminal and the base station and are all positive integers. In an embodiment, k0 is 16, k1 is 16, and k2 is 17.

The first location static identification and the second location static identification refer to the first static identification and the second static identification appearing in the generation equation of the initial value $c_{init}(n_{cdm})$ of the reference sequence from left to right, respectively.

In this way, the reference pilot pseudo-random sequences corresponding to different reference pilot groups may generate different sequences (referred to as second-type reference pilot pseudo-random sequences) because initial values of the reference pilot pseudo-random sequences are different, so that signals of different reference pilot ports on the same symbol form a relatively small PAPR in the time domain and such a PAPR is within the acceptable range. However, since there are low-version users, when the initial values of the reference pilot pseudo-random sequences of different reference pilot groups are the same (referred to as the first-type reference pilot pseudo-random sequences), if both the low-version user and the high-version user perform multiplexing, there may be an error when the low-version user performs interference estimation on the high-version user. Therefore, in order to solve this problem, the high-version user needs to be back off to the case that the reference pilot sequences corresponding to different reference pilot groups are the same, that is, the reference pilot pseudo-random sequences of the M reference pilot groups are determined as the first-type reference pilot pseudo-random sequences through at least one of the following:

the value of a static identifier step size being zero (that is, K=0); the value of a static identifier corresponding to each of M reference pilot groups being identical to each other (that is, values of $n_{cdm}$ corresponding to different reference pilot groups are identical to each other); or a dynamic identification being zero.

Example Eight

The example illustrates that the terminal or the base station determines the initial values of DMRS Type1 or DMRS Type2 pseudo-random sequences based on the reference pilot sequence parameters.

The base station or the terminal determines the initial value of a DMRS pseudo-random sequence in the following manner.

K static identifications, $N_{ID}^0$, $N_{ID}^1$, . . . , $N_{ID}^K$, are configured through high layer signaling, and the K static identifications are divided into L static identification groups, where K is a positive even number, and L is an integer greater than 1 and less than K. For example, when K=4, there are L=2 groups, and each group has two static identifications. Static identifications in a first group are $N_{ID}^0$ and $N_{ID}^1$, and static identifications in a second group are $N_{ID}^2$ and $N_{ID}^3$. Alternatively, when K=6, there are L=2 groups, and each group has three static identifications. Static identifications in a first group are $N_{ID}^0$, and $N_{ID}^1$ and $N_{ID}^2$, and static identifications in a second group are, $N_{ID}^3$, $N_{ID}^4$, and $N_{ID}^5$.

In an embodiment, K is determined according to at least one of: the number of the reference pilot groups, the number of transport layers, or a reference pilot type. For example, K=4 when the pilot group type is DMRS Type1 while K=6 when the pilot group type is DMRS Type1; K=4 when the number of reference pilot groups is 2 while K=6 when the number of reference pilot groups is 3; K=4 when the number of data layers is less than or equal to 4 while K=6 when the number of data layers is greater than 4. The data layer herein is also referred to as layer, transport layer, or a channel rank.

In an embodiment, L is determined according to the number of reference pilot groups, and/or the number of static identifications included in each static identification group is determined according to the number of reference pilot groups. For example, when the number of reference pilot groups is 2, L=2, and each static identification group includes two static identifications; when the number of reference pilot groups is 3, L=3, and each static identification group includes three static identifications.

The static identification group is selected through at least one of the dynamic identification or the reference pilot group index. For example, when the value of the dynamic identification is i, the static identification group i is selected, where i=0 and 1. For example, when the value of the reference pilot group index is i, the static identification group k is selected, where k=i mod 2, i=0 and 1, . . . , and M, and M is the number of static identification groups and is a positive integer. For example, when the value of the reference pilot group index is i and the value of the dynamic identification is j, the static identification group k is selected, where k=(i+j) mod 2, i=0, 1, . . . , and M, j=0 and 1, and M is the number of static identification groups and is a positive integer.

After the static identification groups are selected by using the above method, for example, after the static identification group k is selected, an $m^{th}$ element in the static identification group k is used as the static identification $N_{ID}^l$ of an $m^{th}$ reference pilot group, and the initial value $c_{init}(m)$ of the reference pilot pseudo-random sequence corresponding to the $m^{th}$ reference pilot group is determined by using the static identification $N_{ID}^l$ of the $m^{th}$ reference pilot group and the dynamic identification, where m=0, . . . , and (N−1), and N is the number of reference pilot groups. $c_{init}(m)$ is generated by using the following equation:

$$C_{init}(n_{cdm}) = \left(2^{17}\left(N_{symb}^{slot}n_{s,f}^\mu + l + 1\right)\left(2N_{ID}^l + 1\right) + 2N_{ID}^l + n_{SCID}\right) \bmod 2^{31}.$$

Example Nine

This example illustrates a method in which the base station and the terminal solve the power imbalance.

The terminal transmits the DMRS so that a receiving end acquires a transport channel coefficient to demodulate data, and signals on a port for transmitting the DMRS is composed of signals transmitted by a transmission antenna element according to a weight indicated by precoding. Meanwhile, it also means that the same transmission antenna element needs to transmit signals on multiple DMRS ports. Because of the superposition of multiple signals on the same transmission antenna element, the power of signals is either much higher than the average power or much lower than the average power, causing the power imbalance.

The terminal, according to information indicated by the base station, multiplies the DMRS on at least one port for transmitting the DMRS by a coefficient for the precoding used and then transmits the DMRS to alleviate the transmission power imbalance of the transmission antenna element. Alternatively, the terminal multiplies at least one column of elements in the precoding used by a coefficient and then transmits the DMRS to alleviate the transmission power imbalance of the transmission antenna element. The terminal performs the operation of multiplying the coefficient according to the information indicated by the base station, where the indication information of the base station may be information indicating DMRS ports or may be information indicating precoding codewords. The indicated DMRS ports need to meet a certain condition before the terminal performs the operation of multiplying by the coefficient; or the indicated precoding needs to meet a certain condition before the terminal performs the operation of multiplying the coefficient; or the indicated DMRS ports need to meet a certain condition and meanwhile the indicated precoding also needs to meet a certain condition before the terminal performs the operation of multiplying the coefficient. For example, the condition that the indicated DMRS ports need to meet is that the DMRS ports is one of the following port sets: a port set of DMRS Type 1: {0, 4}, {0, 1, 4}, {0, 1, 4, 5}, {2, 6}, {2, 3, 6}, {2, 3, 6, 7}, or {0, 2, 4, 6}, or a port set of DMRS Type 2: {0, 1, 6}, {0, 1, 6, 7}, {2, 3, 8}, {2, 3, 8, 9}, or {4, 5, 10, 11}. For example, the condition that the indicated precoding needs to meet is that the indicated precoding codewords have one of the following characteristics 1) and 2).

1) All elements in a precoding codeword matrix are non-zero.

2) In a precoding word matrix, at least one row has two non-zero elements.

For example, the indicated DMRS port need to meet the above condition that the DMRS ports need to meet, and the indicated precoding also needs to meet the above condition that the precoding needs to meet.

All elements in the precoding codeword matrix are non-zero. For example, the non-zero elements are codewords for two antennas to transmit DMRSs of two ports:

$$\frac{1}{2}\begin{bmatrix}1 & 1\\ 1 & -1\end{bmatrix}, \frac{1}{2}\begin{bmatrix}1 & 1\\ j & -j\end{bmatrix}.$$

For example, the non-zero elements are codewords for four antennas to transmit DMRSs of two ports:

$$\frac{1}{2\sqrt{2}}\begin{bmatrix}1 & 1\\ 1 & 1\\ 1 & -1\\ 1 & -1\end{bmatrix}, \frac{1}{2\sqrt{2}}\begin{bmatrix}1 & 1\\ 1 & 1\\ j & -j\\ j & -j\end{bmatrix}, \frac{1}{2\sqrt{2}}\begin{bmatrix}1 & 1\\ j & j\\ 1 & -1\\ j & -j\end{bmatrix}, \frac{1}{2\sqrt{2}}\begin{bmatrix}1 & 1\\ j & j\\ j & -j\\ -1 & 1\end{bmatrix},$$

$$\frac{1}{2\sqrt{2}}\begin{bmatrix}1 & 1\\ -1 & -1\\ 1 & -1\\ -1 & 1\end{bmatrix}, \frac{1}{2\sqrt{2}}\begin{bmatrix}1 & 1\\ -1 & -1\\ 1 & -j\\ -j & j\end{bmatrix}, \frac{1}{2\sqrt{2}}\begin{bmatrix}1 & 1\\ -j & -j\\ 1 & -1\\ -j & j\end{bmatrix}, \frac{1}{2\sqrt{2}}\begin{bmatrix}1 & 1\\ -j & -j\\ j & -j\\ 1 & -1\end{bmatrix}.$$

For example, the non-zero elements are codewords for four antennas to transmit DMRSs of three ports:

$$\frac{1}{2\sqrt{3}}\begin{bmatrix}1 & 1 & 1\\ 1 & -1 & 1\\ 1 & 1 & -1\\ 1 & -1 & -1\end{bmatrix}, \frac{1}{2\sqrt{3}}\begin{bmatrix}1 & 1 & 1\\ 1 & -1 & 1\\ j & j & -j\\ j & -j & -j\end{bmatrix},$$

$$\frac{1}{2\sqrt{3}}\begin{bmatrix}1 & 1 & 1\\ -1 & 1 & -1\\ 1 & 1 & -1\\ -1 & 1 & 1\end{bmatrix}, \frac{1}{2\sqrt{3}}\begin{bmatrix}1 & 1 & 1\\ -1 & 1 & -1\\ j & j & -j\\ -j & j & j\end{bmatrix}.$$

For example, the non-zero elements are codewords for four antennas to transmit DMRSs of four ports:

$$\frac{1}{4}\begin{bmatrix}1 & 1 & 1 & 1\\ 1 & -1 & 1 & -1\\ 1 & 1 & -1 & -1\\ 1 & -1 & -1 & 1\end{bmatrix}, \frac{1}{4}\begin{bmatrix}1 & 1 & 1 & 1\\ 1 & -1 & 1 & -1\\ j & j & -j & -j\\ j & -j & -j & j\end{bmatrix}.$$

In the precoding word matrix, at least one row has two non-zero elements. For example, the two non-zero elements are codewords for four antennas to transmit DMRSs of four ports:

$$\frac{1}{2\sqrt{2}}\begin{bmatrix}1 & 1 & 0 & 0\\ 0 & 0 & 1 & 1\\ 1 & -1 & 0 & 0\\ 0 & 0 & 1 & -1\end{bmatrix}, \frac{1}{2\sqrt{2}}\begin{bmatrix}1 & 1 & 0 & 0\\ 0 & 0 & 1 & 1\\ j & -j & 0 & 0\\ 0 & 0 & j & -j\end{bmatrix}.$$

The coefficient may be an imaginary number, a real number, or a complex number.

In order to reduce the complexity of the system, the DMRS on at least one port for transmitting the DMRS is multiplied by a coefficient in the following manner: coefficients multiplied by the DMRS on three ports for transmitting the DMRS being included in coefficients multiplied by the DMRS on four ports for transmitting the DMRS, and coefficients multiplied by the DMRS on two ports for transmitting the DMRS being included in the coefficients multiplied by the DMRS on three ports for transmitting the DMRS. For example, for four ports for transmitting the DMRS, the multiplied coefficients of each port are a, b, c, and d; the coefficients multiplied by the DMRS on three ports for transmitting the DMRS are a, b, and c, respectively; the coefficients multiplied by the DMRS on two ports for transmitting the DMRS are a and b, respectively.

In order to alleviate the power balance problem on the same transmission antenna element, the coefficient multiplied by each port varies with frequency domain resource elements. For example, the coefficient varies with resource blocks, or sub-bands, or frequency domain resource elements bound by the DMRS.

In order to alleviate the power balance problem on the same transmission antenna element, the coefficient multiplied by each port varies with time domain resource elements. For example, the coefficient varies OFDM symbols or slots.

In order to reduce the complexity of the system, at least one column in the precoding used is multiplied by the coefficient in the following manner: coefficients multiplied by two columns in the precoding being included in coefficients multiplied by three columns in the precoding, and the coefficients multiplied by three columns in the precoding being included in coefficients multiplied by four columns in the precoding. For example, the coefficients that four columns in the precoding codeword matrix need to multiply are a, b, c, and d; the coefficients that three columns in the precoding codeword matrix need to multiply are a, b, and c; the coefficients that two columns in the precoding codeword matrix need to multiply are a and b.

In order to alleviate the power balance problem on the same transmission antenna element, the coefficient multiplied by each column in the precoding codeword matrix varies with frequency domain resource elements. For example, the coefficient varies with resource blocks, or sub-bands, or frequency domain resource elements bound by the DMRS.

In order to alleviate the power balance problem on the same transmission antenna element, the coefficient multiplied by each column in the precoding codeword matrix varies with time domain resource elements. For example, the coefficient varies OFDM symbols or slots.

Embodiment Five

An embodiment of the present invention provides a storage medium. The storage medium includes a stored program. When the program is executed, the method of any one of the preceding embodiments is performed.

In the embodiment, the storage medium may be configured to store program codes for performing the steps described below.

In S1, reference pilot sequence parameters are configured.

In S2, an initial value of a reference pilot pseudo-random sequence corresponding to each reference pilot group among M reference pilot groups is determined according to the reference pilot sequence parameters, where the initial value of the reference pilot pseudo-random sequence is used for generating a pilot pseudo-random sequence of a corresponding reference pilot group, each reference pilot group corresponds to at least one reference pilot port, and M is a positive integer.

Embodiment Six

The embodiment of the present invention provides a storage medium. The storage medium includes a stored program. When the program is executed, the method of any one of the preceding embodiments is performed.

The storage medium is further configured to store program codes for performing the steps described below.

In S3, reference pilot sequence parameters are received.

In S4, an initial value of a reference pilot pseudo-random sequence corresponding to each reference pilot group among the M reference pilot groups is determined according to the reference pilot sequence parameters, where the initial value of the reference pilot pseudo-random sequence is used for generating a pilot pseudo-random sequence of a corresponding reference pilot group, each reference pilot group corresponds to at least one reference pilot port, and M is a positive integer.

In the embodiment, the storage medium may include, but is not limited to, a USB flash disk, a read-only memory (ROM), a random-access memory (RAM), a mobile hard disk, a magnetic disk, an optical disk, or any other medium capable of storing program codes.

For examples in the present embodiment, reference may be made to the examples described in the above embodiments and implementations, which will not be repeated herein. Apparently, it is to be understood by those skilled in the art that the modules or steps of the present disclosure may be implemented by a generic computing device and may be concentrated on a single computing device or distributed in a network formed by multiple computing devices. In an embodiment, these modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, each module or step may be implemented by being made into an integrated circuit module separately or multiple ones of these modules or steps may be implemented by being made into a single integrated circuit module. In this manner, the present disclosure is not limited to any specific combination of hardware and software.

What is claimed is:

1. A parameter configuration method, comprising:
    configuring, by a parameter configuration apparatus, reference pilot sequence parameters;
    determining, by the parameter configuration apparatus, according to the reference pilot sequence parameters, an initial value of a reference pilot pseudo-random sequence corresponding to each reference pilot group among M reference pilot groups, wherein the initial value of the reference pilot pseudo-random sequence is used for generating a pilot pseudo-random sequence of a corresponding reference pilot group, M is a positive integer, and each reference pilot group corresponds to at least one reference pilot port,
    wherein the reference pilot sequence parameters comprise at least two static identifications, a dynamic identification, and a reference pilot group index, and
    selecting a static identification from the configured at least two static identifications through the dynamic identification and the reference pilot group index.

2. A parameter receiving method, comprising:
    receiving, by a parameter receiving apparatus, reference pilot sequence parameters;
    determining, by the parameter receiving apparatus, according to the reference pilot sequence parameters, an initial value of a reference pilot pseudo-random sequence corresponding to each reference pilot group among M reference pilot groups, wherein the initial value of the reference pilot pseudo-random sequence is used for generating a pilot pseudo-random sequence of a corresponding reference pilot group, M is a positive integer, and each reference pilot group corresponds to at least one reference pilot port, wherein the reference pilot sequence parameters comprise at least two static identifications, a dynamic identification, and a reference pilot group index, and
    selecting a static identification from the at least two static identifications through the dynamic identification and the reference pilot group index.

3. A parameter configuration apparatus, comprising at least one processor and memory storing instructions, which when executed by the at least one processor, cause the parameter configuration apparatus to:
    configure reference pilot sequence parameters;
    determine, according to the reference pilot sequence parameters, an initial value of a reference pilot pseudo-random sequence corresponding to each reference pilot group among M reference pilot groups, wherein the initial value of the reference pilot pseudo-random sequence is used for generating a pilot pseudo-random sequence of a corresponding reference pilot group, M is a positive integer, and each reference pilot group corresponds to at least one reference pilot port,
    wherein the reference pilot sequence parameters comprise at least two static identifications, a dynamic identification, and a reference pilot group index, and
    selecting a static identification from the configured at least two static identifications through the dynamic identification and the reference pilot group index.

4. A parameter receiving apparatus, comprising at least one processor and memory storing instructions, which when executed by the at least one processor, cause the parameter receiving apparatus to:
    receive reference pilot sequence parameters;

determine, according to the reference pilot sequence parameters, an initial value of a reference pilot pseudo-random sequence corresponding to each reference pilot group among M reference pilot groups, wherein the initial value of the reference pilot pseudo-random sequence is used for generating a pilot pseudo-random sequence of a corresponding reference pilot group, M is a positive integer, and each reference pilot group corresponds to at least one reference pilot port, wherein the reference pilot sequence parameters comprise at least two static identifications, a dynamic identification, and a reference pilot group index, and selecting a static identification from the at least two static identifications through the dynamic identification and the reference pilot group index.

5. The parameter configuration method of claim 1, wherein the reference pilot groups comprise a reference pilot code division multiplexing (CDM) group.

6. The parameter receiving method of claim 2, wherein the reference pilot groups comprise a reference pilot code division multiplexing (CDM) group.

7. The parameter configuration apparatus of claim 3, wherein the reference pilot groups comprise a reference pilot code division multiplexing (CDM) group.

8. The parameter receiving apparatus of claim 4, wherein the reference pilot groups comprise a reference pilot code division multiplexing (CDM) group.

\* \* \* \* \*